(12) United States Patent
Brook et al.

(10) Patent No.: US 8,185,423 B2
(45) Date of Patent: May 22, 2012

(54) JUST-IN TIME WORKFLOW

(75) Inventors: John Charles Brook, Stanhope Gardens (AU); Rawinder Kaur Khera Singh, Pyrmont (AU)

(73) Assignee: Canon Kabushiki Kaisha, Tokyo (JP)

( * ) Notice: Subject to any disclaimer, the term of this patent is extended or adjusted under 35 U.S.C. 154(b) by 1160 days.

(21) Appl. No.: 11/613,019

(22) Filed: Dec. 19, 2006

(65) Prior Publication Data
US 2007/0150329 A1   Jun. 28, 2007

(30) Foreign Application Priority Data

Dec. 22, 2005 (AU) ............................... 2005247025
Dec. 22, 2005 (AU) ............................... 2005247027

(51) Int. Cl.
*G06Q 10/00* (2012.01)

(52) U.S. Cl. ..................... 705/7.13; 705/7.14; 705/7.17; 705/7.25; 705/29; 709/221; 709/227; 370/230; 370/444; 370/335; 370/337; 370/338

(58) Field of Classification Search ........................ None
See application file for complete search history.

(56) References Cited

U.S. PATENT DOCUMENTS

| | | | |
|---|---|---|---|
| 5,790,789 A | 8/1998 | Suarez | |
| 5,826,239 A | 10/1998 | Du | |
| 6,094,431 A * | 7/2000 | Yamato et al. | 370/395.21 |
| 6,249,819 B1 * | 6/2001 | Hunt et al. | 709/232 |
| 6,453,349 B1 * | 9/2002 | Kano et al. | 709/226 |
| 6,515,211 B2 * | 2/2003 | Umezawa et al. | 84/477 R |
| 6,529,499 B1 * | 3/2003 | Doshi et al. | 370/352 |
| 6,603,758 B1 * | 8/2003 | Schmuelling et al. | 370/352 |
| 6,615,186 B1 * | 9/2003 | Kolls | 705/14.51 |
| 6,795,431 B2 * | 9/2004 | Endo | 370/352 |
| 6,820,118 B1 * | 11/2004 | Leymann et al. | 709/223 |
| 6,868,267 B1 | 3/2005 | Briggs et al. | |
| 6,908,391 B2 * | 6/2005 | Gatto et al. | 463/42 |
| 7,054,938 B2 * | 5/2006 | Sundqvist et al. | 709/227 |
| 7,126,963 B2 * | 10/2006 | Peyravian et al. | 370/443 |
| 7,289,527 B2 * | 10/2007 | Ghosal et al. | 370/444 |
| 7,293,069 B2 * | 11/2007 | Gomes et al. | 709/217 |
| 7,297,062 B2 * | 11/2007 | Gatto et al. | 463/42 |
| 7,505,471 B2 * | 3/2009 | Furukawa et al. | 370/400 |
| 7,506,011 B2 * | 3/2009 | Liu et al. | 1/1 |
| 7,633,949 B2 * | 12/2009 | Zadikian et al. | 370/396 |

(Continued)

FOREIGN PATENT DOCUMENTS

WO         03/015000         2/2003

(Continued)

OTHER PUBLICATIONS

Deborah Young. (Apr. 2001). Revisiting flow-through. Wireless Review, 18(7), 14-20.*

(Continued)

*Primary Examiner* — Lynda Jasmin
*Assistant Examiner* — Gurkanwaljit Singh
(74) *Attorney, Agent, or Firm* — Fitzpatrick, Cella, Harper & Scinto

(57) ABSTRACT

Disclosed are arrangements, referred to as just-in-time workflow (JITW) arrangements, which provide a decentralised process (900) for performing a sequence of tasks, in which individual network services successively identify (961), assemble (960) and execute (962) a chain of subsequent network services on the basis of their suitability to communicate over a network and to perform their associated tasks.

20 Claims, 26 Drawing Sheets

U.S. PATENT DOCUMENTS

| | | | |
|---|---|---|---|
| 7,660,731 B2 * | 2/2010 | Chaddha et al. | 705/7.12 |
| 7,689,921 B2 * | 3/2010 | Rajarajan et al. | 715/744 |
| 2002/0007414 A1 * | 1/2002 | Inoue et al. | 709/230 |
| 2002/0055975 A1 * | 5/2002 | Petrovykh | 709/205 |
| 2002/0083178 A1 * | 6/2002 | Brothers | 709/226 |
| 2002/0120755 A1 * | 8/2002 | Gomes et al. | 709/229 |
| 2002/0134224 A1 * | 9/2002 | Umezawa et al. | 89/1.1 |
| 2002/0152133 A1 * | 10/2002 | King et al. | 705/26 |
| 2003/0041130 A1 * | 2/2003 | Harrisville-Wolff et al. | 709/221 |
| 2003/0126001 A1 * | 7/2003 | Northcutt et al. | 705/8 |
| 2004/0114514 A1 * | 6/2004 | Ghosal et al. | 370/230 |
| 2004/0177141 A1 * | 9/2004 | Foody et al. | 709/224 |
| 2004/0230466 A1 * | 11/2004 | Davis et al. | 705/8 |
| 2004/0230636 A1 | 11/2004 | Masuoka et al. | |
| 2004/0267623 A1 * | 12/2004 | Vivadelli et al. | 705/26 |
| 2005/0043979 A1 * | 2/2005 | Soares et al. | 705/7 |
| 2005/0060178 A1 * | 3/2005 | Kirkland et al. | 705/1 |
| 2005/0108032 A1 | 5/2005 | Josephsen et al. | |
| 2006/0047813 A1 * | 3/2006 | Aggarwal et al. | 709/226 |
| 2006/0052095 A1 * | 3/2006 | Vazvan | 455/420 |
| 2006/0293942 A1 * | 12/2006 | Chaddha et al. | 705/8 |
| 2007/0299804 A1 * | 12/2007 | Liu et al. | 707/1 |
| 2008/0028006 A1 * | 1/2008 | Liu et al. | 707/204 |
| 2009/0013023 A1 * | 1/2009 | Kato et al. | 709/201 |

FOREIGN PATENT DOCUMENTS

| | | |
|---|---|---|
| WO | 2004/021131 | 3/2004 |

OTHER PUBLICATIONS

G Zhu, J F Bard, & G Yu. (2005). Disruption management for resource-constrained project scheduling. The Journal of the Operational Research Society, 56(4), 365-381.*

Amedeo Cesta, Angelo Oddi, & Stephen F. Smith. (2002). A Constraint-Based Method for Project Scheduling with Time Windows. Journal of Heuristics: Special Issue: Integration of Constraint Programming and, 8(1), 109-136.*

Shan, et al., "HP Workflow Research: Past, Present and Future", Software Technology Laboratory, Aug. 1997, retrieved from: http://www.hpl.hp.com/techreports/97/HPL-97-105.pdf on Jun. 12, 2008.

Australian Examiner's Report, dated Jun. 13, 2008, issued during prosecution of related Australian application No. 2005247027.

* cited by examiner

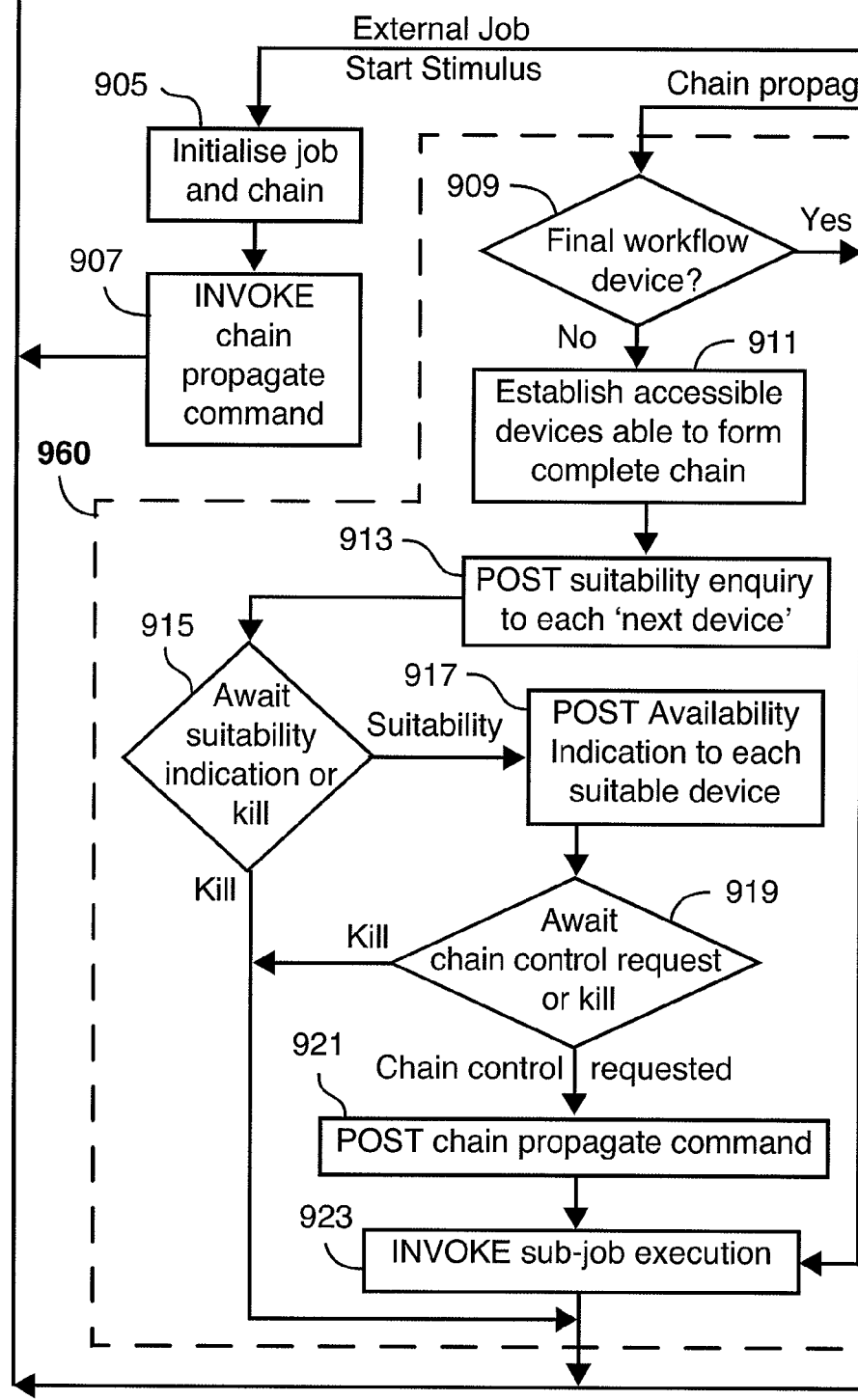

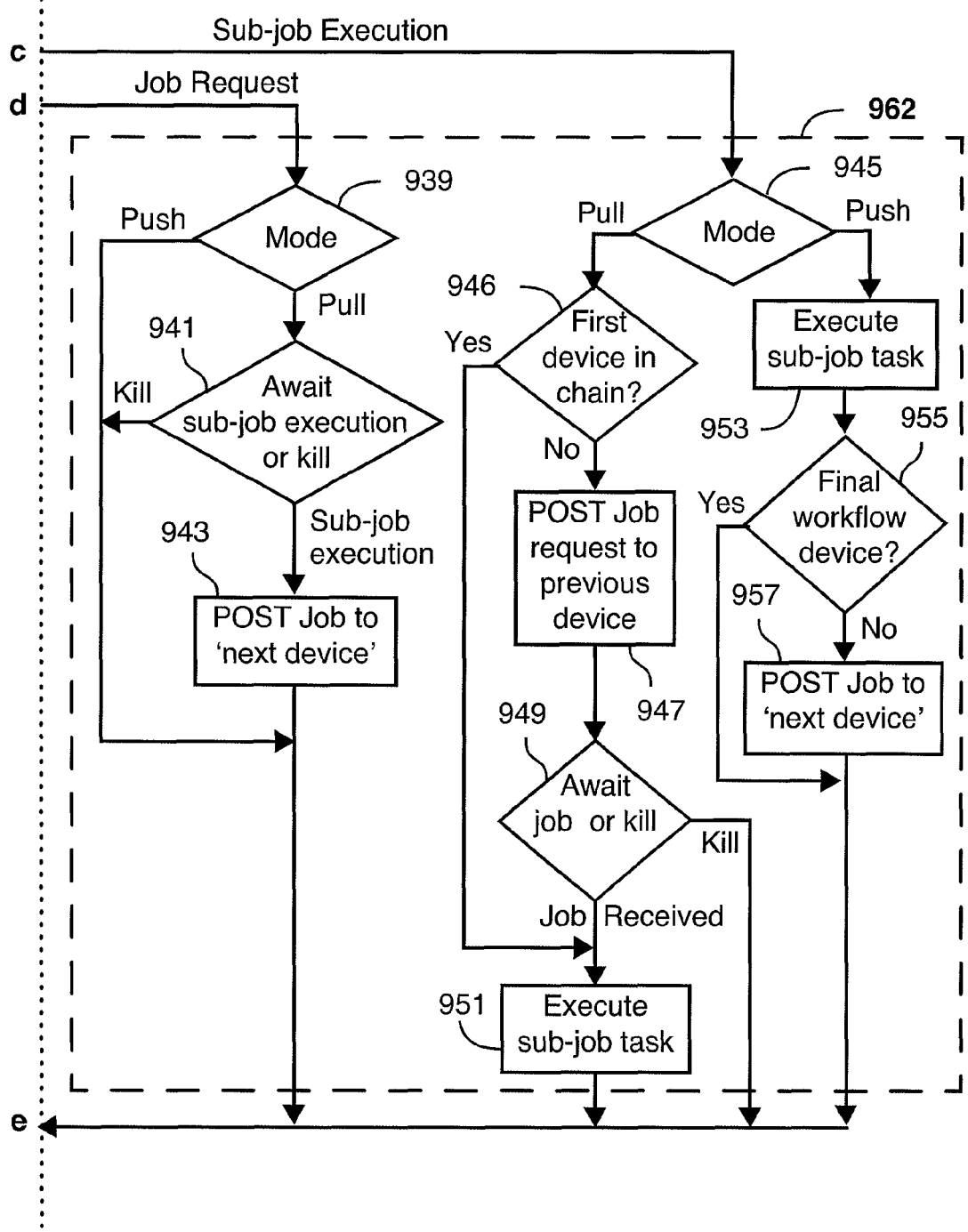

JUST-IN TIME WORKFLOW

FIELD OF THE INVENTION

The current invention relates to the field of business systems for calculating charges for service usage and particularly for business workflow system usage in a networked environment.

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

BACKGROUND

Workflow is the operational aspect of a work procedure, namely how tasks are structured, who performs them, what their relative order is, how they are synchronized, how information flows to support the tasks and how tasks are being tracked. As the dimension of time is considered in Workflow, Workflow considers "throughput" as a distinct measure. Alternately workflow can be considered to be the automation of a business process, in whole or part, during which documents, information or tasks are passed from one participant (being a resource, human or machine) to another for action, according to a set of procedural rules.

State-of-the-art workflow systems suffer from a number of problems that make them inflexible, inadequate or prone to failure when deployed into real business or commercial environments. Two such problematic features of workflow systems are their static definition of workflow processes and their centralisation.

Current business & print workflow systems are inflexible and static once deployed. The typical approaches to definition and deployment of business and print workflow systems involve these steps: a study of the current business environment and possible definition of new, or improved workflows; selection of a workflow management product or products; transcription of the study results and any commissioned workflow process improvements into hard-coded workflow templates for utilisation by the selected product(s); customisation of workflow product features and interfacing of the product(s) and features into existing business systems; training at many levels; and deployment and switch-over to the new workflow system. At this point, a workflow process has been defined, customised and deployed and it should be adequate for the scope of tasks and contingencies recognised at the time of the defining study.

Business workflow requirements rarely remain static. There are numerous dynamic pressures on a business, including, for example, its own growth, that require a business to react appropriately and in new ways, and often in ways not anticipated in the original workflow study and definition steps. These dynamic pressures each have their own characteristics, including repetition frequencies and rates of change.

Some state of the art workflow products attempt to ameliorate these dynamic pressures, which often comprise combination-problems of change, obsolescence and contingency, by providing easier and faster methods of designing workflow templates. There exist workflow template authoring tools that may be used by the workflow product distributor, consultant or the target customer business, to customise or update workflow processes. However, these tools are offline tools, or setup tools and are intended for one-off or low frequency use and they do not significantly improve the essentially static nature of current workflow solutions.

Some workflow authoring tools provide a friendly user interface to increase the capability of understanding of a user defining a workflow template, therefore allowing the workflow authoring to be undertaken by a less-qualified person, such as a target customer employee. This kind of tool might also allow or encourage more frequent updating of the target customer's workflow template. The tools would also typically provide a (re-)deployment means for an updated or created workflow template. However, each redeployed, updated template remains static in its behaviour. Furthermore, the updating and redeployment cycle causes a need for re-training or re-documenting of workflow processes, with a large cost downstream of the update step.

A static, templated workflow process is unable to accommodate high-rate dynamic changes in a target business's activities (e.g. monthly, weekly, daily, hourly change rates or zero-notice changes). The many possible pressures for change on a business workflow can be categorised, with some examples being: internal role and resource changes; internal policy changes; external market pressures demanding internal business strategy changes (e.g. requiring a strategic redesign of prioritisation of workflow process steps, acceleration of some workflow processes, differing profiling of business processes per market or customer, etc); capital investment and internal deployment of new equipment or tools or software; business structural changes; new or modified legislation; customer or supplier business operational changes; equipment failure; internal and external financial pressures; travel or relocation of elements inside or outside a business; and so on.

Even quite minor changes in workflow processes cannot typically be accommodated by typical workflow systems. For example, a casual employee might temporarily replace a person having a role in a workflow process. In some workflow systems the insertion of this casual employee into the appropriate workflow system databases could be restrictively expensive or time-consuming, often incurring a high latency. However, this kind of change is more likely to be supported by more recent workflow systems, which may exhibit a flexibility for minor change up to a threshold, above which the workflow systems become extremely inflexible or brittle in response to change.

Other kinds of minor changes can include 'convenience cases' where users or customers of a workflow system desire or require some flexibility to cope with arbitrary decisions or situations. For example, if a user of a workflow process within a business wishes to or is required to execute a workflow step at a different location or device or using a different service from normal, at zero notice to the system or its administrator or manager, then this might often be impossible for a system to accommodate. Where deployed systems utilise identical computing equipment in all locations, and if a business' security & access control policies allow, a user might be able to execute his/her workflow step at any location or device. However, this homogeneity is not general, and particularly not where heterogeneous devices and services are interconnected with a workflow system or process. Homogeneity can also be expensive or constricting to a business because it can be an inefficient way to distribute and locate services.

A further example of minor changes imposed on a business workflow system is the need to invoke contingencies to cope with equipment or communications or other technology failures, again, at zero notice.

There exist many business processes that cannot be usefully described by current workflow processes or that cannot be adequately supported by current workflow systems because of their requirements for flexibility, convenience, etc. In short, the dynamic pressures on these businesses cannot be accommodated by current workflow methods.

The traditional approach to workflow is to execute workflow state machines or directed graphs (mathematical equivalents) on a central workflow engine, typically a single engine in a fixed physical and network location. The workflow engine, or server, is linked to or integrated with one or more databases containing workflow process templates, access & security information, client device & user details and possibly data materials such as documents. The centralisation of workflow systems creates several disadvantages including, a central zone of failure including the workflow engine and its subsidiary parts and core network facilities; difficulty in accommodating greater demand for computing time, memory and network bandwidths at the workflow engine, resulting in latency in workflow processing and requiring a costly machinery upgrade path; wastage of processing ability in client, subsidiary and other network computing resources, which are typically much more capable than required by the client-side tasks running on them; etc.

Some attempts have been made to reduce the workload of workflow engines or to distribute them across business boundaries or similar, or to reduce their memory needs. These methods are severely limited in their abilities and applicability and retain many of the disadvantages of a single workflow engine.

Agent-based workflow systems include many definitions of the meaning of 'agent' and consequently exhibit a variety of properties. There has been a successful deployment of agents within telecommunications industries, typically for automating service contract fee negotiations or billing services across commercial boundaries. Some recent agent deployments involve management, monitoring or billing for content provision services. These agent applications typically involve instantiating and executing an agent per service-instance upon one or more predetermined workflow computing nodes. That is, an agent workflow engine instance executes on one of a specially designated group of service management machines.

Some hypothesized agent-based workflow implementations allow further decentralisation of workflow execution by spawning a network-mobile workflow engine agent per workflow instance. A network-mobile workflow engine agent might travel between nodes of a network in the execution of its workflow process. This behaviour would allow partial or entire decentralisation of the workflow engine computing and memory resource demands, thus reducing some of the aforementioned problems associated with centralised workflow engines. A cost of such a network-mobile agent approach is again one of homogeneity in which all network nodes (often clients of the workflow process) would be required to support the same minimum system requirements such as including a Java® Virtual Machine, and adequate memory, cpu power, etc.

Usage-based charging methods are well-known. They have been applied to usage of tangible equipment such as photocopiers in which the usage charge is strongly linked to the quantity of copies produced. Usage-based charging has also been applied to intangible services such as content provision systems, ISPs, and even including supply of electricity, movies, and other content, etc.

A goal for vendors of services or of intangible goods is to charge accurately according to the details of the goods or services supplied to the customer, thereby giving the vendor control of its market and of its return on any transaction and giving the customer accurate information about the cost of any requested transaction.

It is also sometimes a goal of vendors of tangible equipment to attract customers to using a service linked with the equipment, to add value to the original equipment, and to provide additional return on investment in the development and production of that equipment.

Vendors may wish to specifically link properties of their products to availability and pricing of value-add services. Vendors may also wish to restrict some value-add services to be provided only for certain of their products (for instance related to level of customer investment in the vendor's products) and to close out customers of rival vendors. Vendors may also wish to have the discretionary ability to define the value-add relationship for individual market segments or individual customers from time to time.

The costs to the vendor of a value-add service may often depend on the specific details of the service undertaken. Parameters such as the quantity of operations or delivered goods are well-known parameters, but these are very limited in their ability to predict the true cost of a value-add service. For example, the cost-per-copy method of charging for copying services and for covering maintenance costs of photocopying equipment does not discriminate at all between the quality of differing jobs (such as may be set on the photocopier's control panel) or of the content of the jobs (such as may vary depending on the colour component of the job, requiring varying amounts of colour toner per job). There are some known methods of 'guestimating' (this term indicating that the estimate is only loosely based upon objective data) the amount of colour toner used per sheet of a copy job to allow modification of the cost-per-copy charge to the customer. There are also methods known of downloading to a customer's photocopier machine a differing charging pattern for cost-per-copy accounting.

These methods suffer from lack of accurate information and from lack of flexibility. Typically, accuracy is limited to the quantity information in a job, particularly to sheets output since this is typically the easiest and most generally applicable accounting method for print-type services or workflows. Other parameters are absent, or poorly accounted for or even guestimated, as in some prior art, providing for a very poor accounting of the true cost of a job.

A workflow process may involve a series of services followed by a goods delivery, for example a commercial printing workflow. There are known billing methods for printing processes that force a customer or retailer to tediously follow a procedure of filling parameters of the job and then the job cost is calculated according to each parameter. Although these methods force a customer or service vendor to specify additional quality parameters such as print resolution, type of print stock, number of colours, etc, these methods may still not take into account a job content parameter, for example, when accounting for the true cost. These methods would also typically be only as flexible as the vendor's job control software system allows. For instance, any special variations in a job would typically involve a guestimation or even write-off of special costs incurred because of the complexity or even impossibility of collecting accurate information to cost the job. Thus, the cost of particular components of the workflow such as ink cost, time per fold type cost, computing cost, even specialist labour cost, and so on, may remain unknown and only estimated, at best.

When a workflow process (or, more typically, processes) are undertaken largely or wholly at a customer's premises then accurate accounting becomes more complex and impractical. There is typically much less ability for a services or device vendor to control the collection and accounting of job information at a customers' site for the purposes of billing. The limitations include highly variable customer environments involving several variables such as networking setup, device and service types and versions, policies and procedures, standards, the customers' need for privacy and security for its job information, and the lack of information about the content and quality of any job, etc. In this context the service or device vendor has insufficient control to deploy and have faith in the success of a true service accounting method.

SUMMARY

It is an object of the present invention to substantially overcome, or at least ameliorate, one or more disadvantages of existing arrangements.

Disclosed are arrangements, referred to as just-in-time workflow (JITW) arrangements, which seek to address the above problems. JITW arrangements enable dynamic decentralised assembly (ie construction) and disassembly of logical instances of a distributed Workflow Process Engine (WPE) for performing a set or sequence of tasks. Different sequences of tasks may require correspondingly different WPEs. The assembly ie construction of a WPE (alternately referred to as a WPE instance or a logical process instance) is triggered by the advent of the sequence of tasks. The entire WPE may be assembled before a first of the sequence of tasks is processed. Alternately, the WPE may be progressively assembled as successive tasks in the sequence are processed (ie WPE construction can be performed substantially simultaneously with performance of one or more tasks); hence the use of the term "just-in-time workflow". Performance of the task may also pause, depending upon the construction of the WPE.

The WPE can be disassembled (ie deconstructed) after all the tasks in the sequence have been processed. Alternately, the WPE may be maintained for further instances of the same type of sequence of tasks. Alternately, the WPE can be progressively disassembled as tasks in the sequence are processed. From a terminology perspective, the WPE "executes" an associated Workflow Process (WP) in order to perform the sequence of tasks. A part of the WPE (ie a partial WPE) "executes" a corresponding part of the associated Workflow Process (WP) (ie a corresponding partial WP) in order to perform one or more corresponding tasks in the sequence of tasks. The WPE comprises a number of network services (which may also be network devices) typically drawn from a pool of heterogeneous network services that are connectable over a communications network. In assembling a WPE, network services successively identify subsequent network services on the basis of the suitability of the subsequent network services to communicate over the network and to perform their associated tasks. The identification of a potential subset of subsequent services can be performed either by one of the previously identified services, a member of the potential subset, or a third service, depending upon a constraint in an appropriate template.

Also disclosed are arrangements, referred to as just-in-time workflow charging (JITWC) arrangements. The JITWC arrangements are applicable to various work flow arrangements, and particularly to Just-In-Time Workflow (JITW) arrangements as disclosed herein.

JITW arrangements enable decentralised assembly and disassembly of instances of a Workflow Process Engine (WPE) for performing a sequence of tasks. Different sequences of tasks may require correspondingly different WPEs. The assembly of a WPE (alternately referred to as a WPE instance) is triggered by the advent of the sequence of tasks. The entire WPE may be assembled before a first of the sequence of tasks is processed. Alternately, the WPE may be progressively assembled as successive tasks in the sequence are processed; hence the use of the term "just-in-time workflow". The WPE can be disassembled after all the tasks in the sequence have been processed. Alternately, the WPE may be maintained for further instances of the same type of sequence of tasks. Alternately, the WPE can be progressively disassembled as tasks in the sequence are processed. From a terminology perspective, the WPE "executes" an associated Workflow Process (WP) in order to perform the sequence of tasks. A part of the WPE (ie a partial WPE) "executes" a corresponding part of the associated Workflow Process (WP) (ie a corresponding partial WP) in order to perform one or more corresponding tasks in the sequence of tasks. The WPE comprises a number of network services (which may also be network devices) typically drawn from a pool of network services that are connectable over a communications network. In assembling a WPE, network services successively identify subsequent network services on the basis of the suitability of the subsequent network services to communicate over the network and to perform their associated tasks.

JITWC arrangements seek to provide an extremely flexible manner of computing customer charges for multiple concurrent workflow processes. The disclosed JITWC arrangements accumulate usage and job information on a per partial workflow process engine basis. This provides very fine charging granularity for multiple concurrent workflow processes based upon a pool of network devices and services that can be used concurrently by multiple Workflow Process Engines. In JITW systems network devices are concurrently shared across a multitude of different non-persistent Workflow Process Engines, and the disclosed JITWC approach enables accumulated usage and job information to be accurately allocated to these concurrent Workflow Process Engines instances.

According to a first aspect of the present invention, there is provided a method of dynamically constructing a distributed process engine comprising an ordered list of network services that forms an instance of a logical process for carrying out a task, wherein said services are drawn from a pool of heterogeneous network services, said method comprising the steps of:

(a) providing a template comprising at least two constraints on network services forming said logical process instance;

(b) selecting and instantiating a first said service from said pool to said ordered list, depending on the first constraint in said template;

(c) identifying a subset of potential second services, by at least one of said first service, a member of said subset, and a third service, depending on a next constraint in said template;

(d) instantiating to said ordered list a second service from within said subset of potential second services based on detection of at least one of an event, a parameter, a status, and a constraint monitored by at least one of said first service, a member of said subset, and a fourth service; and (e) repeating, if the template does not indicate construction is complete, steps (c), (d) and (e) with said second service as said first service.

According to another aspect of the present invention, there is provided a system for dynamically constructing a distributed process engine comprising an ordered list of network services that forms an instance of a logical process for carrying out a task, wherein said services are drawn from a pool of heterogeneous network services, said system comprising:

at least one memory module for storing a program; and at least one processor for executing the program, said program comprising:

(a) code for providing a template comprising at least two constraints on network services forming said logical process instance;

(b) code for selecting and instantiating a first said service from said pool to said ordered list, depending on the first constraint in said template;

(c) code for identifying a subset of potential second services, by at least one of said first service, a member of said subset, and a third service, depending on a next constraint in said template;

(d) code for instantiating to said ordered list a second service from within said subset of potential second services based on detection of at least one of an event, a parameter, a status, and a constraint monitored by at least one of said first service, a member of said subset, and a fourth service; and (e) code for repeating, if the template does not indicate construction is complete, steps (c), (d) and (e) with said second service as said first service.

According to another aspect of the present invention, there is provided a computer program product including a computer readable medium having recorded thereon a computer program for directing a processor to execute a method for dynamically constructing a distributed process engine comprising an ordered list of network services that forms an instance of a logical process for carrying out a task, wherein said services are drawn from a pool of heterogeneous network services, said program comprising:

(a) code for providing a template comprising at least two constraints on network services forming said logical process instance;

(b) code for selecting and instantiating a first said service from said pool to said ordered list, depending on the first constraint in said template;

(c) code for identifying a subset of potential second services, by at least one of said first service, a member of said subset, and a third service, depending on a next constraint in said template;

(d) code for instantiating to said ordered list a second service from within said subset of potential second services based on detection of at least one of an event, a parameter, a status, and a constraint monitored by at least one of said first service, a member of said subset, and a fourth service; and (e) code for repeating, if the template does not indicate construction is complete, steps (c), (d) and (e) with said second service as said first service.

Other aspects of the invention are also disclosed.

BRIEF DESCRIPTION OF THE DRAWINGS

One or more embodiments of the present invention will now be described with reference to the following drawings and Appendices, in which:

FIGS. 9(a), 9(b) and 10 are flow diagram fragments for a device participating in a workflow process of the disclosed JITW arrangements.

Figure 21:
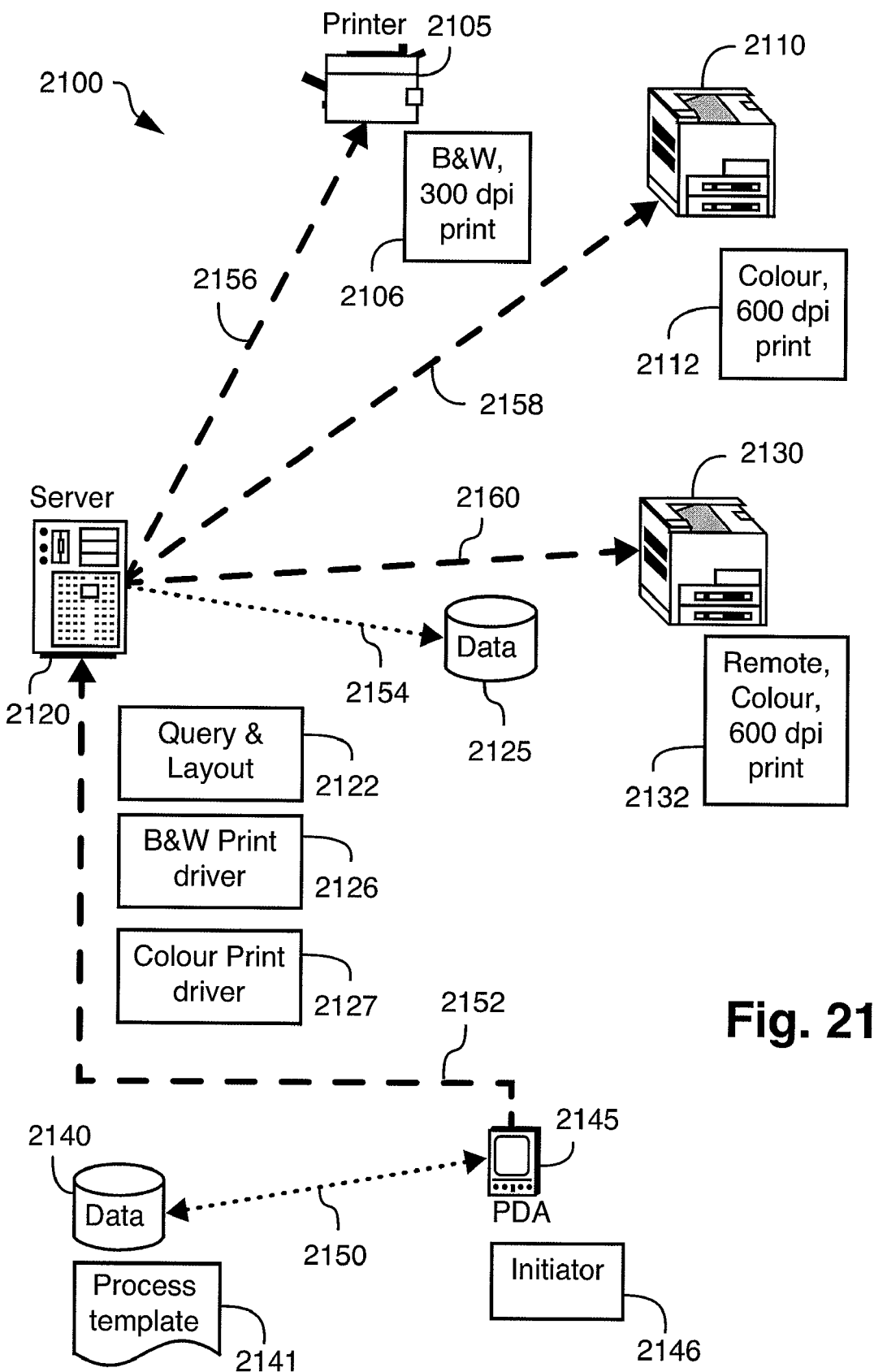
FIG. 21 is a system diagram showing an exemplary workflow process use-case of document data update by query, re-layout and multiple printing with auditing and accounting.

Table 1 shows exemplary job metadata that could be sent to an audit server by the use-case example of FIG. 21;

Appendix A shows an exemplary XML workflow process template fragment for a PDA device permitted to be involved in a staff purchase workflow and a document search workflow.

Appendix B shows an exemplary XML workflow process template fragment for a scanner device permitted to be involved in a staff purchase workflow.

Appendix C shows an exemplary XML workflow process template fragment for a printer device permitted to be involved in a staff purchase workflow.

Equation 1 is an exemplary cost-accounting equation potentially computed by an account server for the exemplary workflow process use-case of FIG. 21 based on a subset of the metadata provided to and by the audit server also participating in the exemplary use-case of FIG. 21.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.
Just-in-Time Workflow The disclosed JITW arrangements relate to the field of business workflow, and particularly relate to document workflow in an office, corporate, commercial, or print-process environment utilising network communications. The purpose of the disclosed JITW arrangements is to dynamically enable and construct a workflow process that is specially capable of functioning in real-world conditions, under imposition of zero-notice or arbitrary constraints. A templated workflow process is one, similar to the prior art, that is partially or wholly pre-defined in a provided template in terms of the workflow process' sequence of processing, or its end-to-end transformation of data, or its event-based behaviour or its parameters, or its security and access control parameters or any of these and more details of execution. The disclosed JITW arrangements provides for creation and execution of a workflow process that is adapted in its construction to, or by, real-world conditions or constraints to perform the required, templated workflow process, thereby enabling a Just-in-Time Workflow Process.

Figure 1:
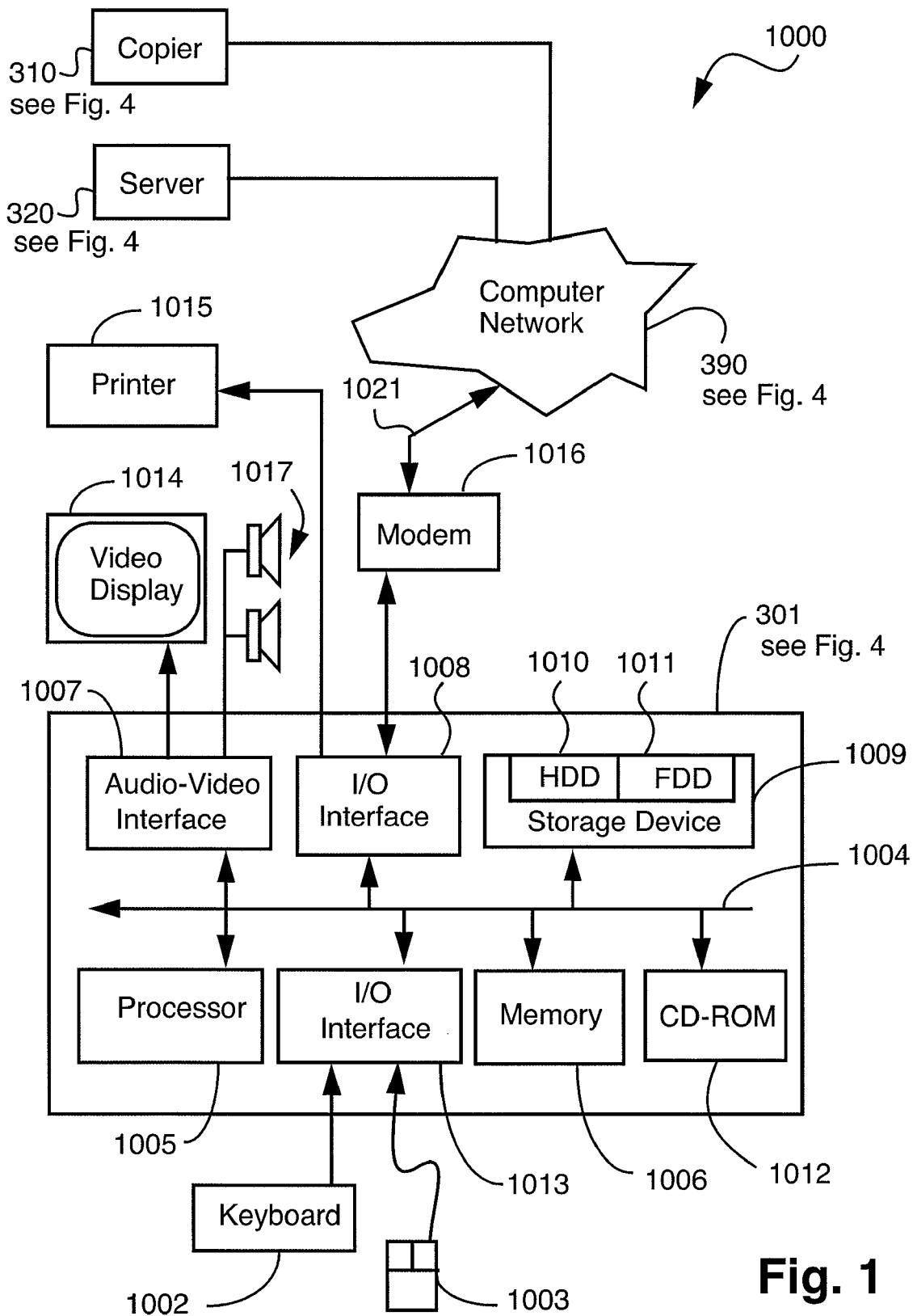
FIG. 1 is a functional block diagram of an interconnected computer system upon which described methods for JITW can be practiced.

FIG. 1 is a functional block diagram of an interconnected computer system upon which described methods for JITW and JITWC can be practiced. The JITW and JITWC methods lends themselves to implementation on a system of interconnected computer systems 1000, such as that shown in FIG. 1 wherein the JITW and JITWC processes of FIGS. 2A-2C, 5A-5B, 7A-7B, 9, 11, 12A-12B, and 14-20 can be implemented as software, such as distributed JITW and JITWC software applications executing within the various interconnected computer modules in the computer systems 1000. In particular, the steps of the JITW and JITWC methods are effected by instructions in the software that are carried out by the computer(s).

The instructions can be formed as one or more code modules, each for performing one or more particular tasks. Each software module, running on one of the interconnected computer modules in the computer system 1000, can also be divided into two separate parts, in which a first part performs the JITW and JITWC methods, and a second part manages a user interface between the first part and the user on the particular computer module in question.

The software can be stored in a computer readable medium, including the storage devices described below, for example. The software is loaded into each of the computer modules from the computer readable medium, and then executed by the respective computer modules. A computer readable medium having such software or computer program recorded on it is a computer program product. The use of the computer program product in the computer preferably effects an advantageous apparatus for performing the JITW and JITWC approach.

The computer system 1000 is formed by a number of computer modules 301, 310, 320 and so on. See FIG. 4 for more detail. Although FIG. 4 makes specific reference to different network devices including a workstation 301, a copier 310, a server 320 and so on, it is apparent that each of these network devices incorporates a computer module, and it is to these computer modules that the computer system 1000 primarily relates. The server is used both in the JITW and JITWC arrangements, and can function to accumulate the usage and job information relating to the JITWC arrangements as well as to form part of workflow process engines in the JITW arrangements. Each of the network devices in question typically has at least one processor, at least one memory module and other computer modules such as communication modules, and the presence of these modules will be assumed without further explicit mention. The following description is directed to the computer module 301, however it also applies, with appropriate modifications, to the other computer modules in the system 1000.

The system 1000 also includes, in relation to the computer module 301, input devices such as a keyboard 1002 and mouse 1003, output devices including a printer 1015, a display device 1014 and loudspeakers 1017. A Modulator-Demodulator (Modem) transceiver device 1016 is used by the computer module 301 for communicating to and from a communications network 390, for example connectable via a telephone line 1021 or other functional medium. The modem 1016 can be used to obtain access to the other network devices 310, 320 across the Internet, and other network systems, such as a Local Area Network (LAN) or a Wide Area Network (WAN), all these networks being represented in FIG. 1 by the network 390, and can be incorporated into the computer module 301 in some implementations.

The computer module 301 typically includes at least one processor unit 1005, and a memory unit 1006, for example formed from semiconductor random access memory (RAM) and read only memory (ROM). The module 301 also includes an number of input/output (I/O) interfaces including an audio-video interface 1007 that couples to the video display 1014 and loudspeakers 1017, an I/O interface 1013 for the keyboard 1002 and mouse 1003 and optionally a joystick (not illustrated), and an interface 1008 for the modem 1016 and printer 1015. In some implementations, the modem 1016 can be incorporated within the computer module 301, for example within the interface 1008.

A storage device 1009 is provided and typically includes a hard disk drive 1010 and a floppy disk drive 1011. A magnetic tape drive (not illustrated) can also be used. A CD-ROM drive 1012 is typically provided as a non-volatile source of data. The components 1005 to 1013 of the computer module 301, typically communicate via an interconnected bus 1004 and in a manner which results in a conventional mode of operation of the computer system 1000 known to those in the relevant art. Examples of computers on which the described arrangements can be practised include IBM-PC's and compatibles, Sun Sparcstations or alike computer systems evolved therefrom.

Typically, the JITW and JITWC application programs are resident, in regard to the computer module 301, on the hard disk drive 1010 and read and controlled in its execution by the processor 1005. Similar JITW and JITWC software applications are similarly resident on the other network devices 310, 320 and so on. Intermediate storage of the program and any data fetched from the network 390 can be accomplished using the semiconductor memory 1006, possibly in concert with the hard disk drive 1010.

In some instances, the JITW and JITWC application programs can be supplied to the user encoded on a CD-ROM or floppy disk and read via the corresponding drive 1012 or 1011, or alternatively can be read by the user from the network 390 via the modem device 1016. Still further, the software can also be loaded into the computer system 1000 from other computer readable media. The term "computer readable medium" as used herein refers to any storage or transmission medium that participates in providing instructions and/or data to the computer system 1000 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of transmission media include radio or infra-red transmission channels as well as a network connection to another computer or networked device, and the Internet or Intranets including e-mail transmissions and information recorded on Websites and the like.

First Arrangement of the JITW Technique

Figure 2A:
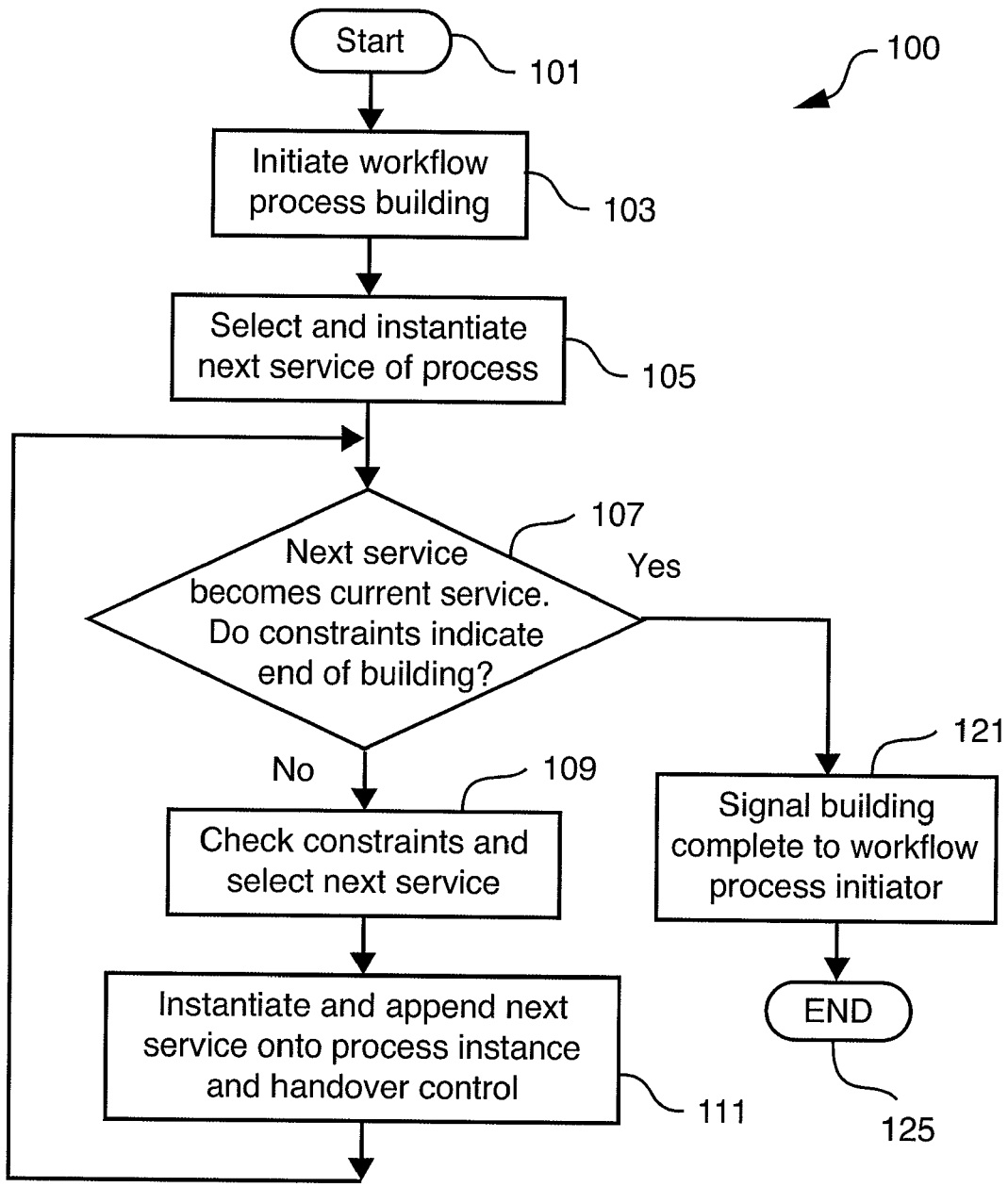
FIG. 2A is a flow diagram showing a first arrangement of a workflow process assembly method of the disclosed JITW arrangements.

A first process, this capable of implementation as an application software program, for performing an example of the JITW approach is shown in FIG. 2A. The method, 100, assembles a workflow process from a sequence of network services, according to a set of constraints. The term "network service" is taken to mean either a network service or a network device such as a printer.

The aforementioned "assembly of a workflow process" refers to a method for putting in place a set of network services and/or network devices that are suitable for performing a desired sequence of tasks. These tasks can comprise, in a particular example, making a purchase request on the workstation 301 using, for example, a web form service. The web form service selects the copier 310 as being suitable to perform the next step in the workflow, and hands control of the workflow over to the copier 310 when the purchase request has been completely filled in. See FIG. 6 for a more detailed description in this regard.

The process 100 starts at 101, from which process building is initiated at step 103. The step 103 can typically involve some triggering event, including a device-based or software-based event or a user-based event (e.g. a user clicking on a PDA launch icon) that causes a workflow process launcher to execute. Such a launcher might involve any standard operating system or multi-tasking scheduler initiation of a process or task, as is well-known in the art. In particular, the workflow process launcher activates the JITW software modules in some or all of the network devices and services in the system 1000 (see FIG. 1). Alternatively, step 103 can involve the execution of a specially designed launcher for launching a unique workflow process or for launching any workflow process. Step 103 would typically involve input, provision or detection of an identifier, event type, parameter, status, constraint or other data or metadata that could be passed out by 103 into 105 to identify an appropriate workflow process template. The detection of the identifier, event type, parameter, status, constraint or other data could be monitored by an initial (first) service, a member of a potential subset of services from which the subsequent service could be drawn, or another service. A workflow process template can itself be provided to or by step 103 instead of the aforementioned identifier.

At 105, the desired workflow process is initiated by identifying and instantiating the next (in this case, the first) service of the workflow process. As mentioned, the identification is by means of or leads to the selection of an appropriate workflow process template. This template provides a set of constraints on the workflow assembly method 100. There are other constraints (hereby named 'external constraints') that will typically affect method 100 and these would typically come from real-world sources such as user choices of devices, or user-entered parameters, or from network sources such as the availability of certain devices or services, or from a device's internal capabilities or various constraints, and from other sources that will be explained or exemplified later.

The selection of the first service of the workflow process assembly at 105 can typically depend on the selected template. The first service would typically be some input service or event-wait service, such as, respectively, input of a user parameter or a wait for a document to be updated in a database. The first service might also involve both an input and an event-wait together such as a wait for a completed web form.

At step 107, the next service is redesignated as the current service. Step 107 involves a test to see if the workflow building process is completed. This test is performed by testing the constraints known to the building process to see if completion criteria are met. The test, 107 is typically performed by, or in association with the last service appended to the workflow process under construction. A preferred implementation of the method 100 would involve each appended service (at 105 and 111) performing the completion test 107 during or after the service being appended to the end of the workflow process (ie to the ordered list of services comprising the workflow process in question).

The service assembly at 105 and 111 preferably involves instantiation of a service, or some equivalent context-based operation, in a device.

The constraints that are checked at 107 can be template or external constraints. A preferred operation method for 100 would be that the template would list constraints and values that would control completion of the workflow process assembly. Such constraints might include a list of the types of (network) services and their order of assembly, in the form of an ordered list, or merely identification of the last service type of a workflow process (e.g. a printer device/service). The template can also identify or reference some external constraints that provide control of the completion condition tested at 107 for the workflow process assembly. An example of this kind of template-referenced external constraint might be that a service completion event message has been received. External constraints can also control the completion test at 107 without being explicitly identified in the workflow process template. An example is that a service or device can have an inherent event wait constraint that the service or device itself identifies, implicitly, as an assembly completion condition. Such an event could be, for example, a print complete event, or a database save completion event.

If the test at step 107 is false, execution proceeds to step 109 at which the instantiated service checks template and external constraints to identify which should be the next service type to append to the workflow process. This identified next service is then instantiated and appended to the workflow process at step 111. Execution then proceeds to step 107 again.

As can be understood by consulting FIG. 2A, method 100, the workflow process comprises a sequence of instantiated services (the term 'service' hereby includes the meaning of 'device' unless otherwise indicated). Each service type is available in a pool of services scattered around a network. Services can be virtual, or real (such as in device-based). Services can execute at a fixed physical location that can be inherent and explicit (such as a networked photocopier) or that can be merely implied (e.g. a software service executing on a server on a network, wherein the physical location, although fixed, is irrelevant). Services can also have no fixed location, such as agents or floating software services that can execute on any number of physical network nodes depending on the constraints during their instantiation.

The workflow process assembly method 100 involves each last-instantiated service being responsible for executing steps 107, 109, 111 until a service obtains a positive answer to the completion test in 107. That aforementioned service is the last service of the workflow process and the workflow process is now instantiated. As may be realised, there need not be any specific location at which this workflow process instance is actually executing. In general, the execution occurs in a distributed form across a network. Preferably, the execution would occur at network nodes or devices as is decided by the constraints. Therefore, the constraints define the characteristics of the assembled and instantiated workflow process. In fact, the external constraints would often include real-world and dynamic information and the method 100 is therefore capable of assembling a workflow process that is specifically adapted to the dynamic, real-world, zero-notice constraints typical of the human workflow environment. Furthermore, method 100 does not centralise the execution of the instantiated workflow process onto one of a restricted number of high-speed, expensive workflow engines. The method of 100 naturally distributes the execution of the workflow process across any number of nodes of the network, as is governed by the constraints affecting 100. Therefore, there may be a reduced or eliminated need for installation of expensive high-speed workflow engines into a network.

Figure 3:
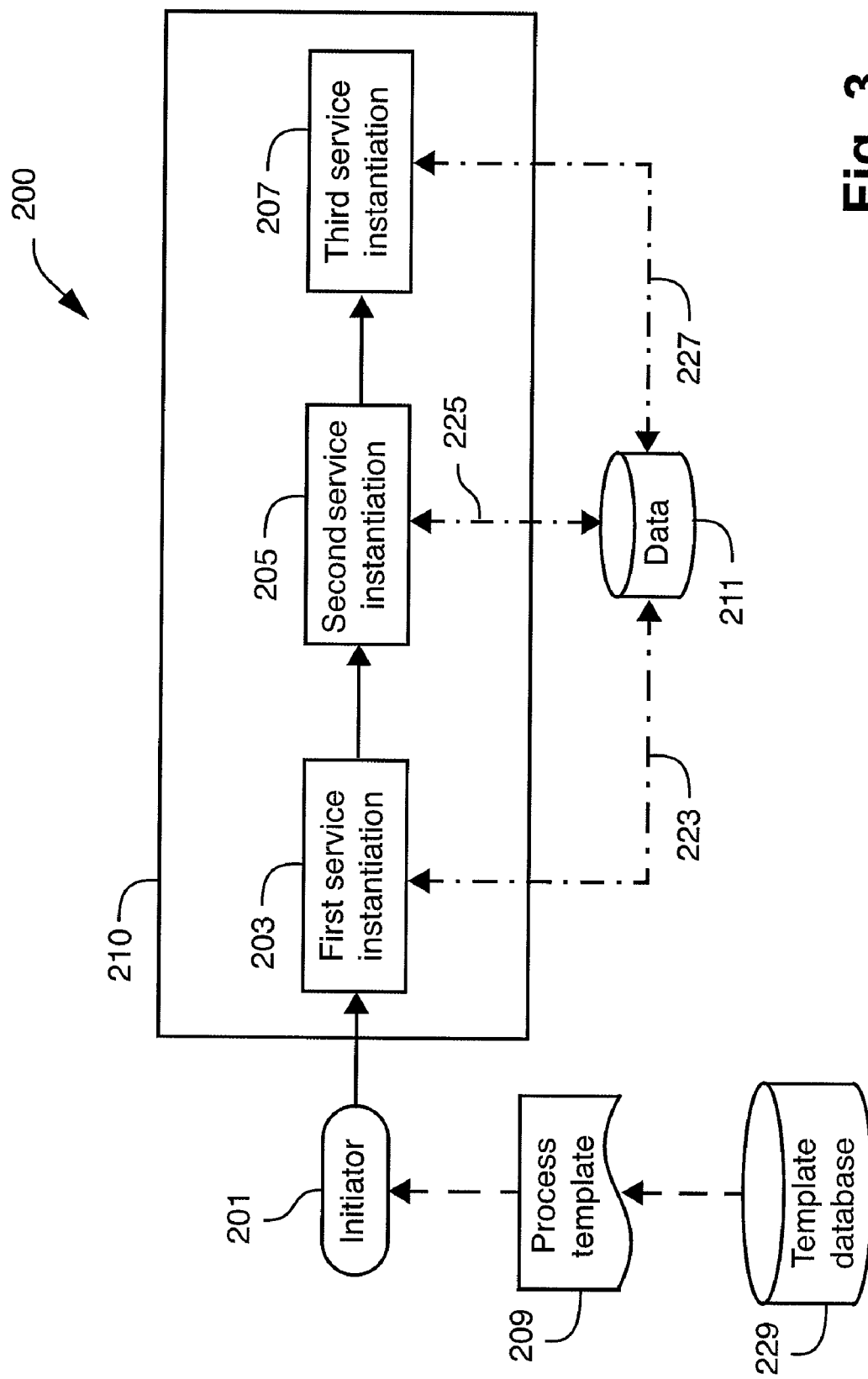
FIG. 3 shows an exemplary workflow process chain of services.

FIG. 3 indicates a graphical representation 200 of an assembled and instantiated workflow process 210 comprising a sequence of services. Example 200 includes an initiator 201 which was launched at the step 103 (see FIG. 2A). The initiator 201 was provided information to enable selection of a process template 209 from a database 229 or other internal or external data source (not shown). By consulting the process template 209, the initiator 201 selected and instantiated the first service 203 at the step 105 in FIG. 2A.

The initiator 201, having instantiated the first service 203, would handover assembly control to the first service 203. The first service 203 performs the completion test step 107, thereby testing process template and/or external constraints for an assembly completion condition. Detecting a false value at the step 107, the first service 203 would check the constraints in the process template and/or the external constraints to identify the next process (205) to be selected from the network pool and appended and instantiated at 111 as second service 205.

Similarly, the instantiated service 205 is handed control of the assembly by the first service 203. The second service 205 executes the step 107 in a similar manner to the way in which the first service 203 executed the step 107. However, the second service 205 will perform its own selection of relevant constraints for testing from the process template and these may not be identical to the constraints selected and tested by the first service 203. Further, the second service 205 can also test at the step 107 external constraints that differ from those tested by the first service 203 when it executed the step 107.

The second service 205 detects a false result from the step 107 and then performs the step 109, checking process template and external constraints to identify and select the next service type to append to the workflow process. At the step 111, the second service 205 appends and instantiates the third service 207 and hands over control to the service 207. The third service 207 executes the step 107, as have previous instantiated services in this workflow process assembly method 100, however, this time, the third service 207 detects a true condition at the completion test step 107 and the third service 207 proceeds to execute the step 121.

The service instantiation steps 105 and 111 include passing of at least one parameter to the instantiated service, this parameter performing the primary task of connecting the instantiated services in the order in which they were appended to the workflow process. This parameter passing helps to append the newly instantiated service to the growing workflow process. The previous service also retains the address of the next process that it caused to be instantiated. These actions thereby enable the workflow process self-assembly and inherent communication. There are many known methods for allowing services or software processes to communicate and many of these are potentially applicable. For example, if external storage such as the database 211 is available, then only a reference or workflow process instantiation ID need be passed as a parameter to each next service, for instance an ID passed from the service 203 to the service 205 and thence to the service 207. That parameter can then be used by the service 205 to index the database 211 via a connection 225, as did the service 203 via 223 and as will the service 207 via 227, to establish context information and service URIs, etc to support the working of the instantiated workflow process 210. If the database 211 URI is not natively known to the instantiated services then that database URI will also need to be passed to each instantiated service at append time. Other forms of inter-service communication include passing larger volumes of data, such as files or streams between services, therefore not requiring the external database 211 or similar.

A significant function of the inter-service communication is to communicate the workflow process template that defines the workflow under construction and provides the template constraints information to each service. This is how the service executing at the steps 107 and 109 obtains the workflow process template and template constraints information. It may also be how the workflow instantiator at the steps 103 & 105 knows which workflow process to start building and which is the first service to instantiate.

It may be realised that variations of the method 100 are possible to achieve equivalent results. For example, the workflow instantiator may in fact be itself the first service of a workflow process as specified in a workflow template. In addition, the constraint analysis and decision steps 107 & 109 might be merged or even swapped, with slight changes in behaviour but achieving a substantially equivalent result as the first JITW arrangement method 100.

It may also be realised that in FIG. 3, the initiator, 201 might itself be a first service of the instantiated workflow. Also, any service, such as 203, might be a compound service, such as is 210, for example. Therefore, a single service need not provide all of the functionality required to self-assemble into a workflow. In fact a service might be 'docked' into a group service (such as 210 for example) and the communication & self-assembly facilities might be provided by other parts of the group service.

It may also be realised that there are many less flexible methods of embodying the disclosed JITW arrangements with at least partially equivalent results to the method of 100 and the example 200. For example, the workflow process template, 209, might be hard-coded into one or more services, as a 'native' workflow. Such services would then have less need for communication information or an external data repository such as 211. Another variation might be that the process workflow template explicitly defines the URIs for each service type (i.e. the location of the executable for a service type) and/or even instantiation IDs of each service, therefore providing each instantiated service with implicit communication and a fixed, or quasi-fixed workflow process result. These alternative methods are approaching some of the state of the art inflexible methods involving predefined connectivity and workflow steps.

Figure 4:
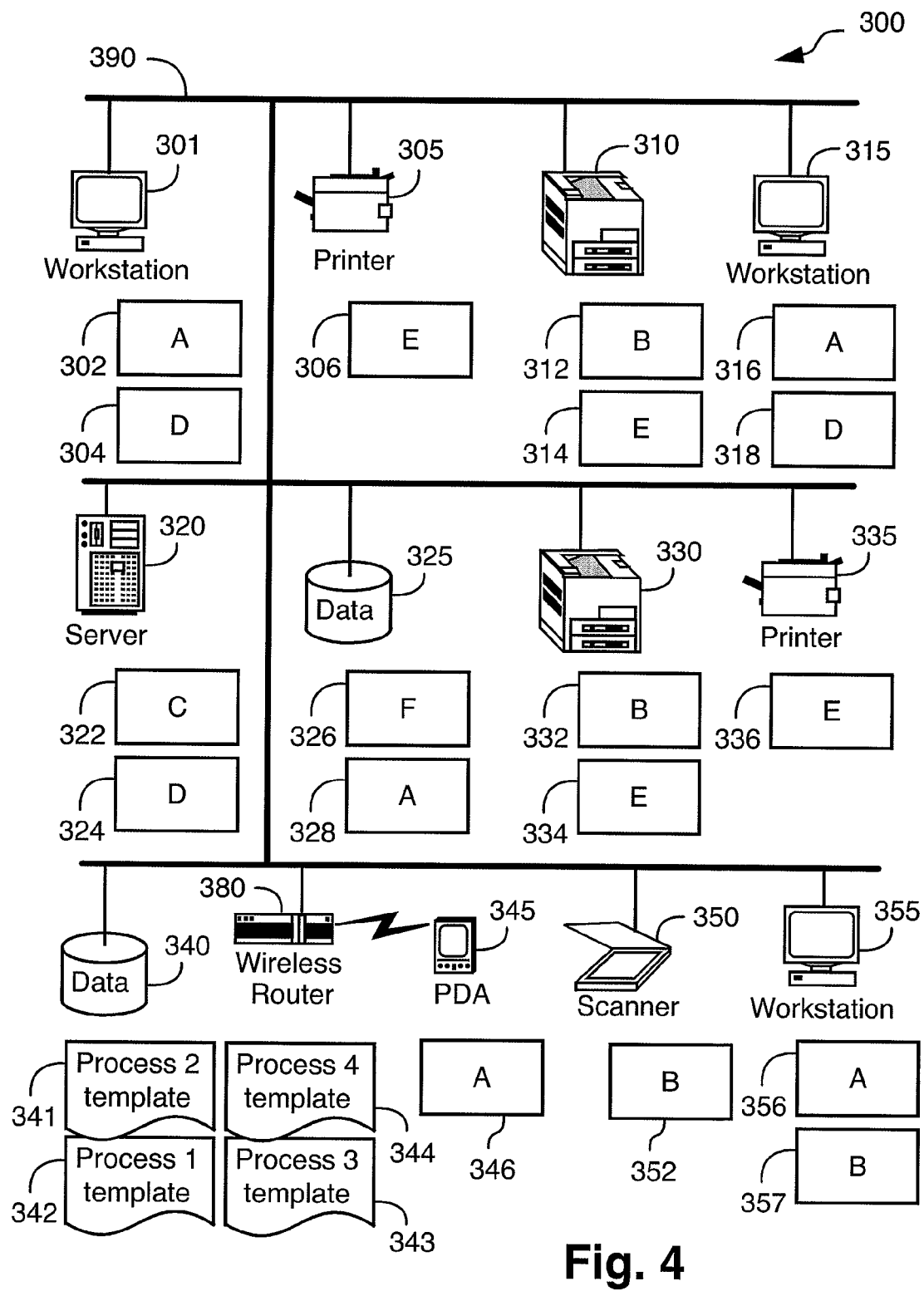
FIG. 4 shows an exemplary network pool of devices and services.

FIG. 4, depicts an exemplary network 300 in which a group of network devices and network services are networked together so that they can communicate. The network, 390, can be a LAN, WAN or the internet. Devices and services can be local, such as on a local corporate intranet, remote such as in a corporate WAN, remote as in an internet-connected print business, or remote as in anywhere on the internet. The incorporation of remote devices or services typically requires the use of specific protocols and command formats such as HTTP protocol, XML, SOAP and XML RPC, for instance in order to penetrate firewalls and to be supported by generic network systems. In a corporate WAN, it is possible that customised or proprietary protocols and command formats will be used.

The network 300 in FIG. 4 exemplifies a pool of services and devices available to a Just-in-Time workflow process. The network is heterogeneous, as are many corporate offices, containing some equivalent or identical services. Workstations 301 and 315 each support service types A, 302, 316, and D, 304, 318. These services might include a document processing service such as layout, or a host rendering printer driver service, for example. These services may be identical in all respects except for their physical location and the hardware on which they will be executed.

Printer 305 may be a basic laser printer with print service E, 306, that requires a host renderer service such as service D, either 304 or 318. Printer 335 with service 336 is another example of the same but in a differing physical location.

Photocopier 310 offers a scanning service B, 312 and a quality-colour printing service E, 314. Photocopier 330 also offers the same services B, 332 and E, 334. Also offering scanning or document creation services B, 352 and 357 are networked scanner 350 and workstation 355. Workstation 355 also offers a service type A, 356, as does PDA 345 offer service type A, 346 via wireless connection to router 380. A scanning or document creation service such as these examples of service B may be used as a service appended to a workflow process. Such a service allows input of an analogue-paper original document as an electronic document that can be manipulated by subsequent services in the workflow process.

Server computer 320 offers services C, 322 and D, 324. Database (server) 325 offers services F, 326 and A, 328. Database (server) 340 offers workflow process templates 341, 342, 343, 344 for guiding and constraining construction of differing workflow process types.

Returning to FIG. 2A, at step 121, after the last service is instantiated and appended, the last service signals the workflow process initiator such as 201, that the assembly process is completed. The last service can be aware of its status as the last service from the building instructions and constraints within the workflow process template. For example, previous services may have annotated the template to provide information of the previous services and the initiator in the workflow process. The initiator has been waiting for this signal, as shown by the method 130 in FIG. 2B. The workflow process assembly ends at 125.

Figure 2B:
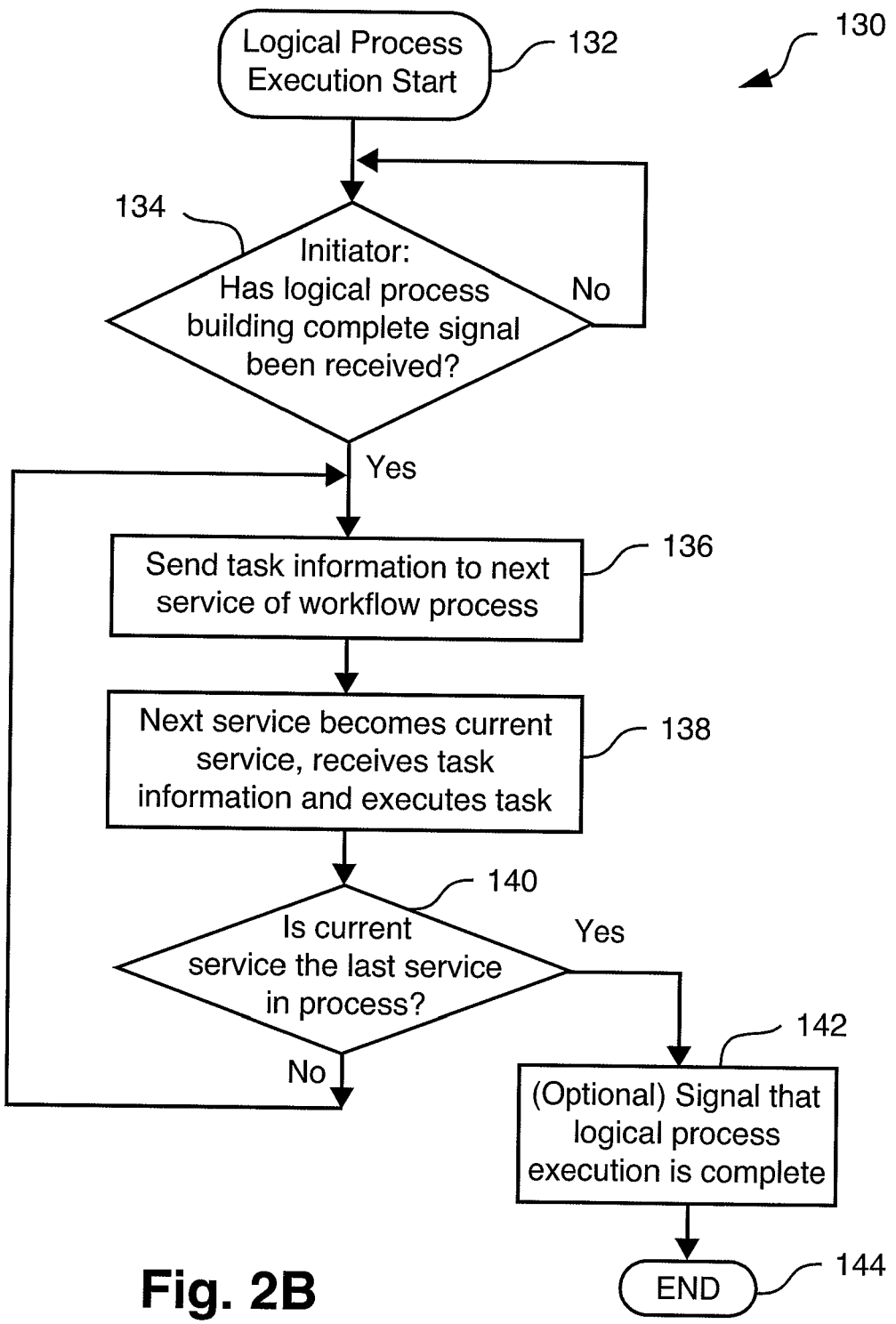
FIG. 2B is a flow diagram showing a first arrangement of a workflow process execution method of the disclosed JITW arrangements.

FIG. 2B, method 130 shows the execution phase of the Just-in-Time workflow process. Method 130 starts at 132 at the initiator and typically starts after 105 in FIG. 2A. Method 130 loops at 134 until the assembly complete signal is received from 121 by the initiator. Once the assembly complete signal is received, the initiator (or the current service at subsequent iterations) at 136 sends the actual task (or job) information, data files and commands or their database references to the next service in-line in the workflow process. The next service, at 138, becomes the current service. It receives the commands and data from the initiator and it executes its specific service on the task data according to any relevant constraints specified in the workflow process template and/or external constraints (this being referred to as "performing" the task). The result of performing the aforementioned specific service is referred to as an "outcome" of the task that has been performed. Then at 140 the current service determines, typically from the workflow process template, if it is the last service in the workflow process. If it is not then the current service forwards its output data and commands onto the next service in line by executing 136, and so on until a current service determines, at 140, that it is the last service in the workflow process. At 142 the current service signals the initiator that the execution phase has completed and thence the execution phase ends at 144. Any errors etc can also be reported to the initiator at this point. Typically the services involved in the execution phase will provide some incremental modification, processing or other benefit to the task data, thereby causing the workflow process to execute the desired behaviour as described in the workflow process template. The services can accumulate status and error information for the last service to forward to the initiator. However, it will be obvious to those skilled in the art that several alternative behaviours are possible for accumulating and reporting this kind of information.

Figure 2C:
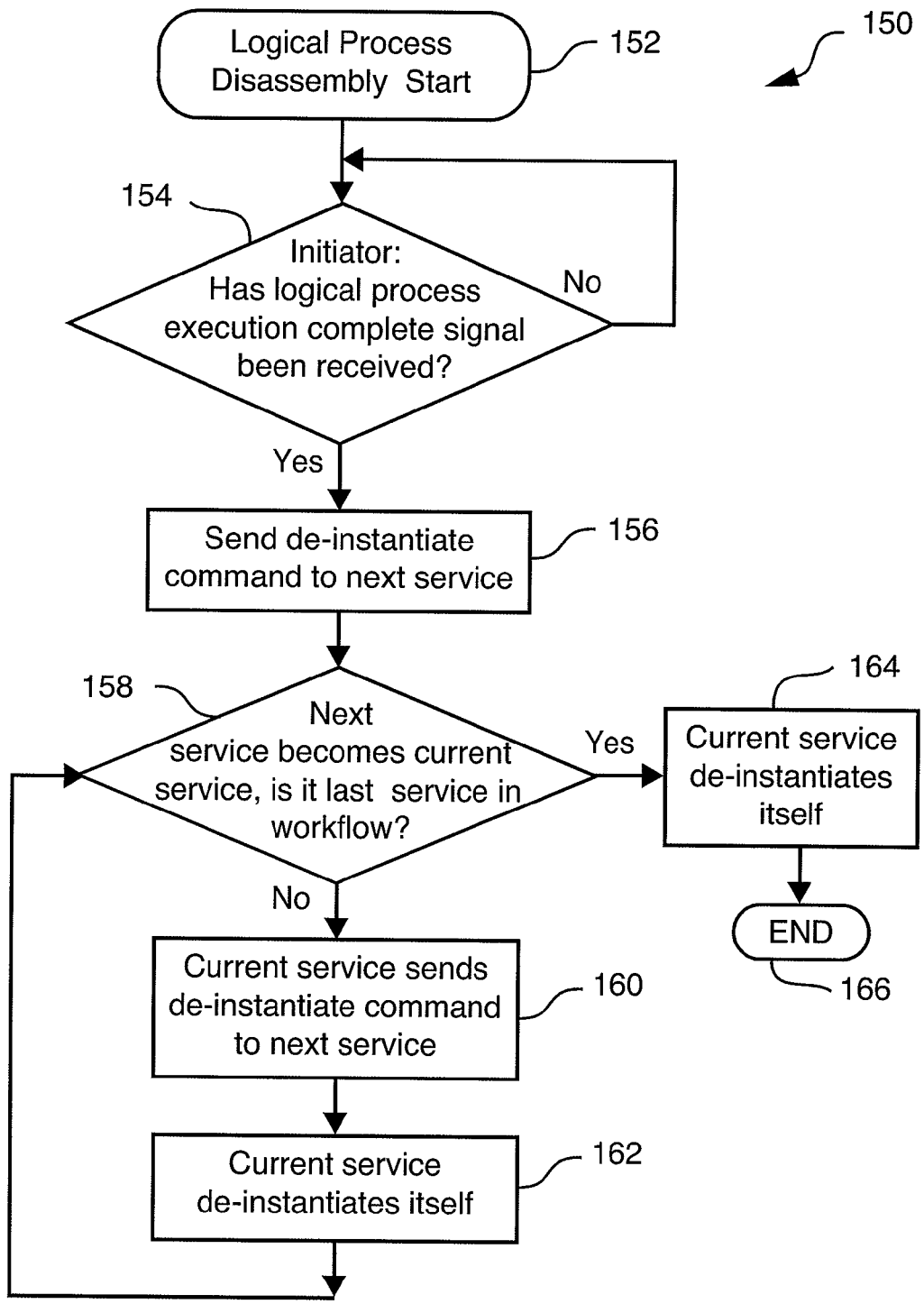
FIG. 2C is a flow diagram showing a first arrangement of a workflow process disassembly method of the disclosed JITW arrangements.

The end of execution phase signal sent to the initiator at 142 is accepted by the initiator at 154 in FIG. 2C, method 150. The initiator can begin to execute the loop 152 & 154 after completing 136 from method 130 in the execution phase. Method 150 is the disassembly phase of the Just-in-Time workflow process. On detection of the signal from 142, looping at 154 ceases and the initiator executes 156. The initiator can optionally de-instantiate itself at the end of executing 156. That matter is implementation dependent.

At 158 the next service (immediately in sequence after the initiator) becomes the current service and determines if it is the last service (typically by consulting its copy of the workflow process template). If the current service is not the last service then execution proceeds to 160 at which the current service sends a de-instantiate command to the next service. At 162 the current service de-instantiates itself. The cycle repeats from 158 as the workflow process disassembles itself until the last service is reached at which execution moves from 158 to 164 and the last service de-instantiates itself and the workflow process and disassembly method both end at 166.

The combined methods of FIGS. 2A, 2B and 2C comprise sequential and non-interleaved methods of workflow process assembly, execution and disassembly. This first JITW arrangement is suitable for enabling, supporting and enhancing single-shot workflows in which human interaction tends to occur only at the beginning of the workflow. This suitability is because of the latency between the assembly process responding to an external constraint, such as user interaction, and the subsequent execution phase. Some example use-cases for this first JITW arrangement include print runs, process-and-save workflows, or process-and-send workflows or similar.

Second JITW Arrangement

Figure 5A:
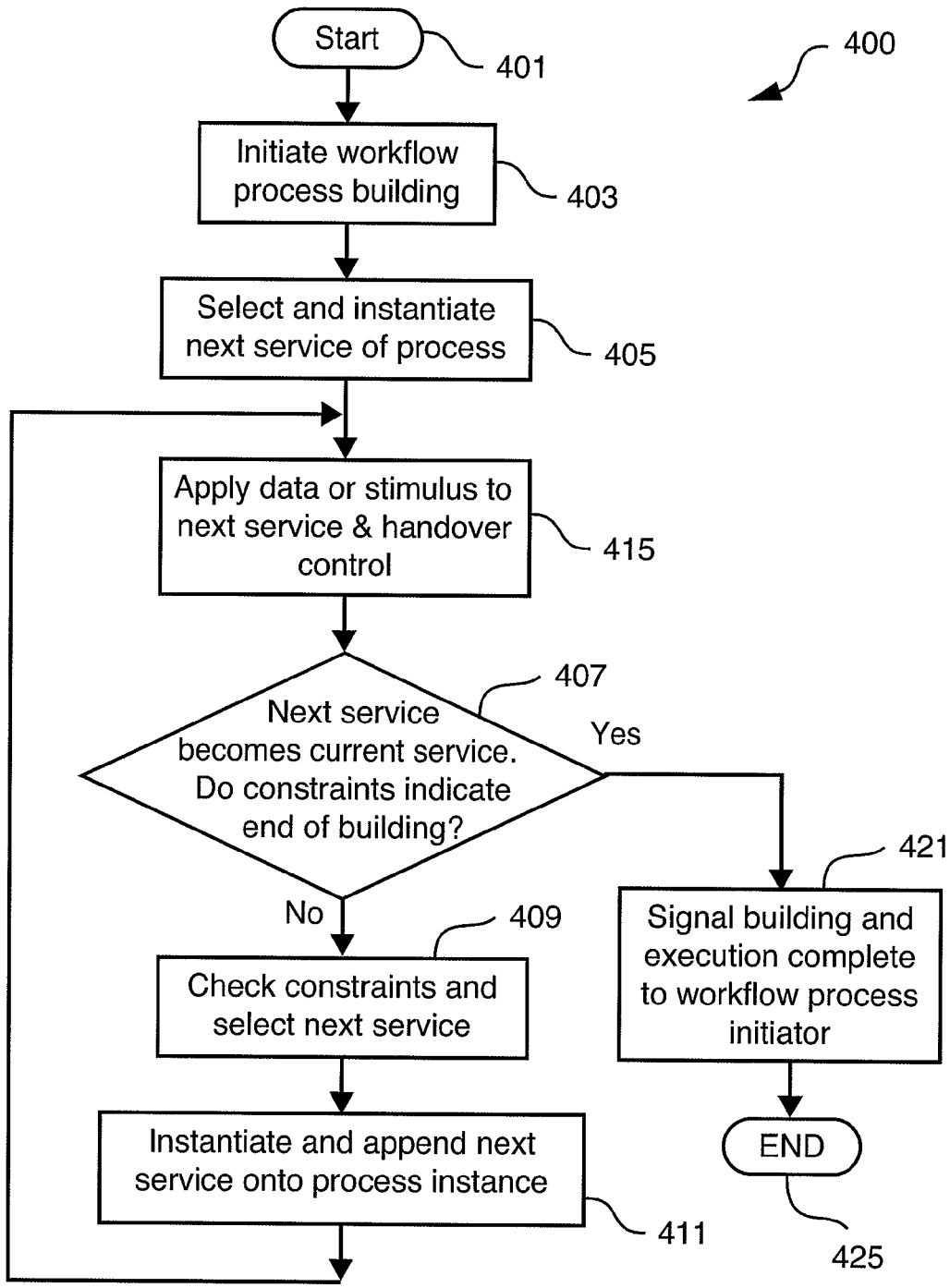
FIG. 5A is a flow diagram showing a second arrangement of a workflow process assembly and execution method of the disclosed JITW arrangements.

A second version of the disclosed JITW arrangements is shown in FIG. 5A, method 400. Method 400 comprises an interleaved workflow process assembly and execution method. The disassembly method 150 of FIG. 2C is also applicable to the second JITW arrangement.

The method 400 begins at a step 401 where a workflow process initiator executes just as for the first JITW arrangement. At a step 403 the initiator analyses the workflow process template supplied to it or referenced to it and at a step 405 it selects and instantiates the next (first) service of the workflow process. At a step 415, the initiator (or the current service at subsequent iterations) applies the task data or event stimulus to the instantiated (next) service, thereby causing that next service to commence its execution phase. At a step 407 the next service becomes the current service (i.e. the current end of the workflow process chain assembly) and tests the workflow process template and/or external constraints to determine if it should be the last service of the workflow process assembly. If the test returns false, execution continues to a step 409 and a subsequent step 411 at which functionality is the same as described for the step 109 and the step 111 in FIG. 2A. After the step 411, execution loops back to the step 415 and the current service passes its output data and output stimulus to the next service and then it hands over control. Eventually, a current service determines at the step 407 that it is the last service in the completed workflow process and execution moves to the step 421 where the initiator is signalled that workflow process assembly and execution are completed and the method ends at a step 425. The initiator continues from the step 152 in the method 150 of FIG. 2C and initiates the workflow process disassembly as previously explained for the first JITW arrangement.

The second JITW arrangement and the first JITW arrangement allow a workflow process to be executed multiple times between assembly and disassembly. If the disassembly method of FIG. 2C is delayed by the initiator then an assembled process might have a second execution phase initiated by the initiator. This behaviour may be convenient where multiple identical workflow processes are required with the same template constraints. Typically, the multiple execution phases would be independent, where the instantiated workflow process 'engine' would be re-used without the overhead of disassembling and re-creating it.

The second JITW arrangement provides a workflow process behaviour such that a workflow process is assembled and its individual services execute their task-related processing in a follow-on method that chases the workflow assembly. This behaviour provides for better interactivity with users as will be shown later in relation to FIG. 6.

Third JITW Arrangement

Figure 5B:
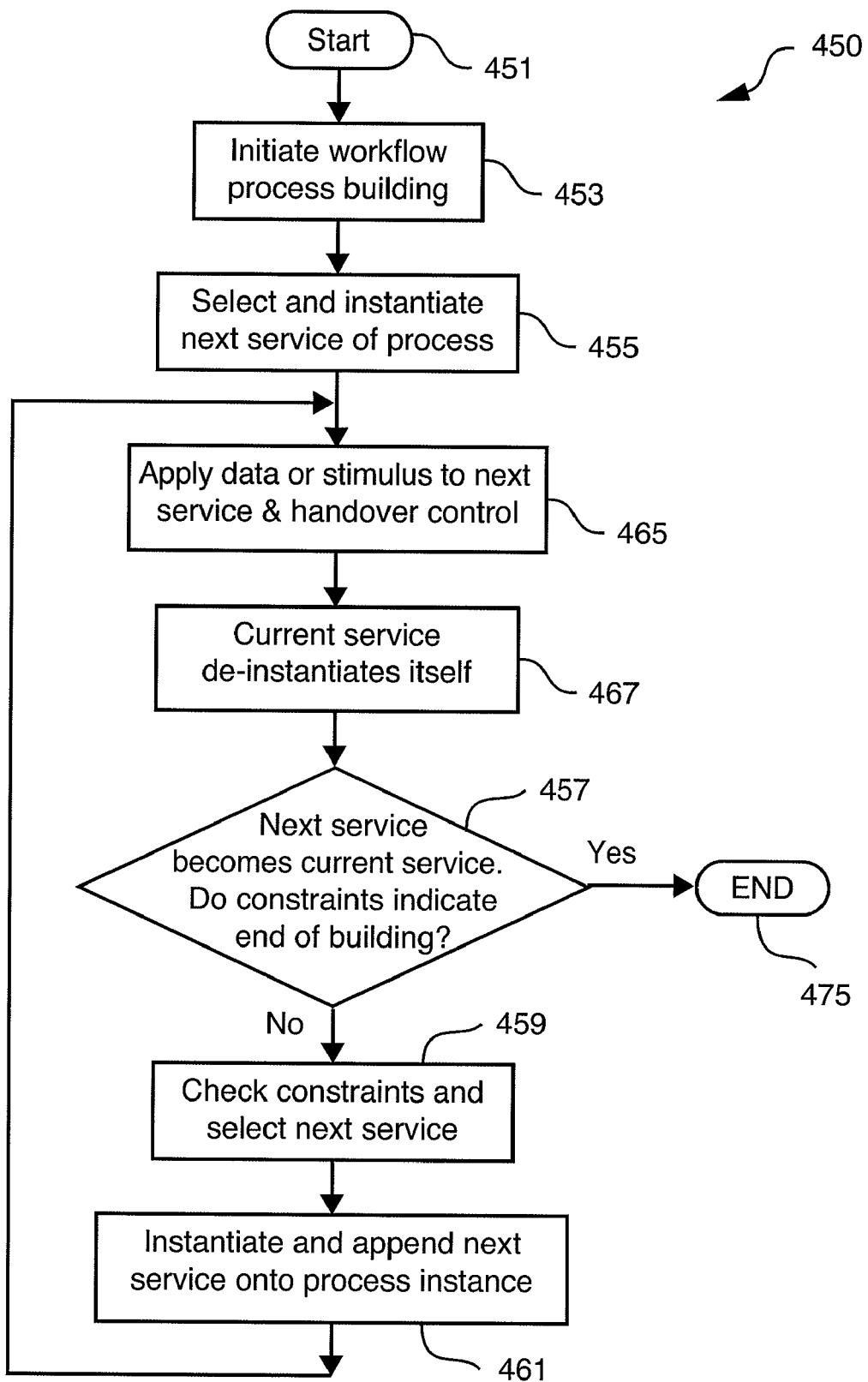
FIG. 5B is a flow diagram showing a third arrangement of a workflow process assembly, execution and disassembly method of the disclosed JITW arrangements.

A third JITW arrangement is shown in FIG. 5B, method 450. This JITW arrangement is very similar to the second JITW arrangement with the addition of a step 467. The method 450 corresponds in most respects to the method 400, with steps 451, 453, 455, 465, 457, 459, 461 and 475 of the method 450 corresponding to the steps 401, 403, 405, 415, 407, 409, 411 and 425, respectively of the method 400. The step 467 is inserted into the method 450 after step 465, by contrast with the method 400, enabling a current service that has been appended and that has completed its own execution to de-instantiate itself prior to the next service executing and processing the task data and/or stimulus. This self de-instantiation of services within the workflow process means that a separate de-instantiation phase is not required and so there is no step in 450 analogous to 421 in 400. (Note that in the first iteration through the loop, step 467 is null as there is no "current service" yet defined.)

The third JITW arrangement provides a workflow process behaviour such that a workflow process is assembled and its individual services execute their task-related processing and then de-instantiate in a follow-on method that chases the workflow assembly. This behaviour, in a similar manner to the second JITW arrangement, provides for better interactivity with users.

The third JITW arrangement also reduces the need for the control feature of the initiator and the need for signalling from the last service in the workflow process chain to the initiator. In fact, an initiator is not required in the third JITW arrangement. The first service in a workflow process may itself be an initiator because it no longer has much special management responsibility compared to that required by initiators in the first and second JITW arrangements.

This totally interleaved method 450 provides strong de-centralisation of the features of the workflow process chain, allowing a chain to continue processing a workflow even though most of the chain has disassembled, therefore not with-holding expensive network resources from other activities. For example, if a particular service had a high processing latency, or awaited an event stimulus that had not arrived, then only the very local portion of the workflow process would be instantiated near that service. Preceding and succeeding services need not be instantiated any more, or yet (whichever is applicable) and therefore the network resources would be largely available for other execution of other tasks. In other words, while a network resource is not being used at all, it can be regarded as being fully available. While the resource is being used, it may be unavailable, or alternately, it may be partially available, ie less available than when not being used at all, but not unavailable. Thus, for example, a printer that uses a print queue to organise print jobs has reduced availability as the queue fills up, but does not become unavailable unless the queue is full. This is a significant advantage of the disclosed JITW arrangements. Not only is the workflow engine de-centralised and distributed, it is using precisely only the resources that are required by a small portion (typically a single service) of any executing workflow process. It could be said that the workflow engine is a virtual entity. It has no discrete existence for all workflow processes, rather each workflow process assembles its own engine, uses it in an efficient manner and then disassembles it.

Figure 6:
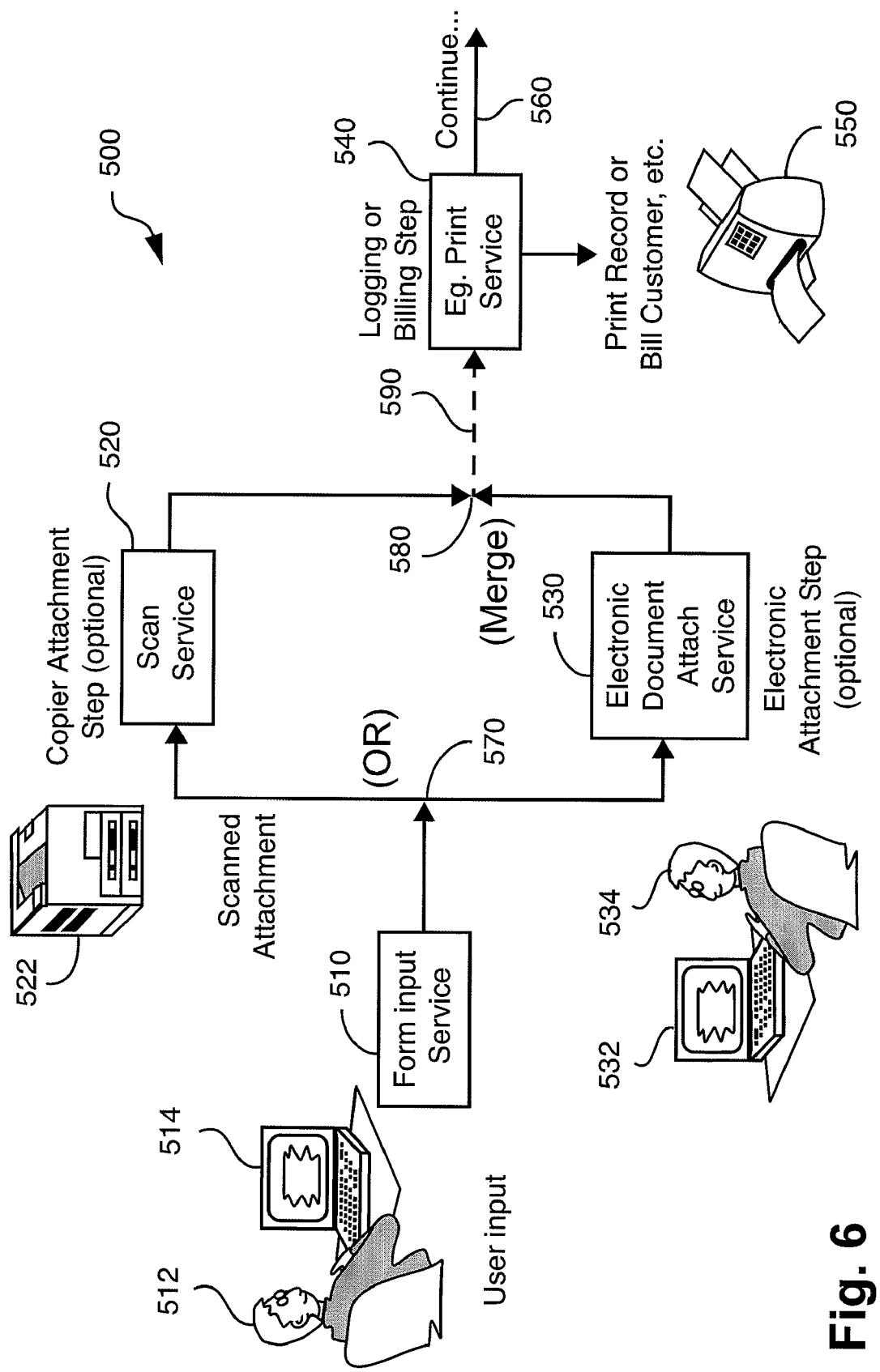
FIG. 6 shows an exemplary use-case of a staff purchase workflow process for the disclosed JITW arrangements.

FIG. 6, 500 illustrates an example involving multiple user-interactivity points that is applicable to both the second and third versions of the disclosed JITW arrangements. If FIG. 6 represented a corporate workflow process such as a purchase request, then user 512 inputs details of the purchase request on a device 514, using, for example a web form service 510. The purchase request is an example of a sequence of tasks, since a number of different tasks need to be performed in order to complete the purchase request. The service 510 can also perform as the workflow process initiator and it instantiates the next (ie subsequent) service(s), by selecting a subsequent network service if it is suitable (ie capable) of communicating with the current network service, and if it is suitable for performing the subsequent task. Service 510 then forwards information (eg information describing the fact that the current task is a first step in the sequence of tasks associated with the purchase request) or references such as the workflow process template and the form input data (noting that the form input data is an outcome of the current task, since the form input data results from performance of, ie completion of the current task). As may be seen in FIG. 6, the service 510 is instructed by the workflow process template (not shown) to instantiate two services. So, returning to the method 450, the steps 455 and 465 would be applied by the service 510 to two parallel, subsequent services 520 and 530. Thence either of the subsequent services 520 and 530 would independently proceed to assemble the workflow process from the step 457, and so on.

An advantage of this workflow process bifurcation as shown in FIG. 6 is to allow real-time, zero-notice responses to external constraints. For example, the corporate purchase request workflow process template requires support for two alternative means of inputting supporting information, such as a supplier quotation. The workflow process template intends that the supplier quotation information will be appended to the purchase request form data in some way and potentially processed with it. The second and third JITW arrangements can support this emergent functionality of the Just-in-Time workflow process by passing execution control to both of the services 520, a copier scan service implemented within copier 522, and 530, an electronic document attachment service (ie a subsequent service) operating inside computer 532. At 570 workflow process execution effectively proceeds to the steps 520 or 530, but not both. In practice, service execution would likely commence at both the step 520 and 530 and then an event wait or similar external constraint wait (these being further constraints and further events) would ensue at both services. Then whichever service (ie subsequent service) received its event stimulus (this being an outcome of the current task or a characterising parameter of the current event) first, would reactivate the workflow process and allow workflow process execution to continue downstream via a junction 580, etc. The merge point at 580, FIG. 6 does not typically mean a data merge, but represents alternate return paths for execution of the workflow process.

Now that the workflow process of FIG. 6 is suspended at 520 and 530, a user 534 may arbitrarily, and at zero-notice, decide which input method will be used for the required quotation document. The user may approach the copier 522 and enter the workflow process ID (as may have been indicated at 514 and later at most devices such as 522) and scan a hardcopy document using the copier facilities and thereby causing the event stimulus wait at 520 to be completed and allowing 520 to control the subsequent workflow process propagation. A workflow process ID can be merely a unique identifier that is common to all instantiated services in a workflow process, established through parameter passing at service instantiation.

Alternatively, the user 534, may, as shown, approach the computer 532 and cause the service 530 to execute, attaching an electronic quotation document to the workflow process, where-upon 530 takes control of propagating the workflow process via 580.

It may be seen that a significant advantage of the disclosed JITW arrangements is to allow arbitrary decisions by human users (or by equivalent automatic processes) at zero-time, within the constraints set by a workflow process template and the external constraints implicit to a particular service type.

It may also be seen that another significant advantage of the disclosed JITW arrangements is to allow alternative input of differing document types, specifically electronic documents (at 532) or hardcopy paper documents (at 522). Thus, a Just-in-Time workflow enables a user to make an arbitrary or unplanned, zero-notice decision about a parameter or data portion of a workflow process.

It may also be seen that another significant advantage of the disclosed JITW arrangements is to allow location-dependent execution of a workflow process. In FIG. 6, service 530 could be a similar but alternate document scanning service to that of 520, and being provided by another physical duplicate (not shown) of copier 522, but in a differing physical location. Thus, a user may select whichever service they wish to use by parameters such as physical location, or input document type (electronic or hardcopy) and so on.

It may also be seen that another advantage of the disclosed JITW arrangements is to accommodate the failure or absence of arbitrary services or devices in a network. As a workflow process self-assembles, the failed services will be avoided. Furthermore, a similar method can be used to perform load-balancing of services within a network environment. One of the constraints imposed on the self assembly of a workflow process could be a test of service or device workload. For example if a printer has a heavily-loaded job queue then it might not be selected and appended to a workflow process because the preceding service could be instructed by the workflow process template to test the printer's workload status as a constraint.

A more capable workload management method can alternatively be implemented using the Just-in-Time Workflow method: a job might be apportioned between several similar devices (e.g. printers) according to external constraints such as speed, quality, other workloads on the devices and also cost of printing at each device. The capabilities depend on the level of detail of constraints that are included in a workflow process template or in a service's behaviour. It is easy to see that a workload management service could be listed for assembly in a bulk printing-type workflow process template, thereby allowing complex control of printer workload by that specialist service. There is a trade-off available to an implementor of a Just-in-Time workflow system: maintaining a high level of generality and simplicity to the Just-in-Time workflow services' interaction and communication capabilities is expected to be cost-effective and to support wide applicability, and is balanced by provision of specific services to provide more complex or specialist control; whereas, an alternative Just-in-Time workflow system could be made more specialised, being widely sensitive to many specialist external constraints and requiring a higher-level of interaction and communication capability for each service comprising the system.

Continuing the description of FIG. 6, the workflow process propagates from 520 or 530 via 580 through any further services (590) that were instructed by the workflow process template and thence into 540 a print service. Print service 540 sends its output data to printer 550, which prints the appropriate hardcopy document for the workflow. As is shown, there is a second output from print service 540 that proceeds via 560 to potentially other services until the workflow process ends. This kind of workflow process bifurcation as shown at 540 may behave differently from that occurring at 570. A purpose of the bifurcation at or just after 540 is to allow the workflow process to execute divergent processes that are not expected to re-converge or merge at a subsequent node in the workflow process. So, as shown in FIG. 6, 500, the workflow process causes a record of the purchase process workflow instance to be printed at 550. This step might represent many possible similar occurrences such as printing a purchase order, or logging the workflow or creating an audit trail, etc. The other branch of the workflow at 560 may continue with differing output from 540 to that sent to 550. For example, 540 may perform a pass-through function to 560, passing the data output by previous services at 590 to 560 without affecting it. 560 may then proceed to propagate the workflow process to further services.

Fourth JITW Arrangement

Figure 7A:
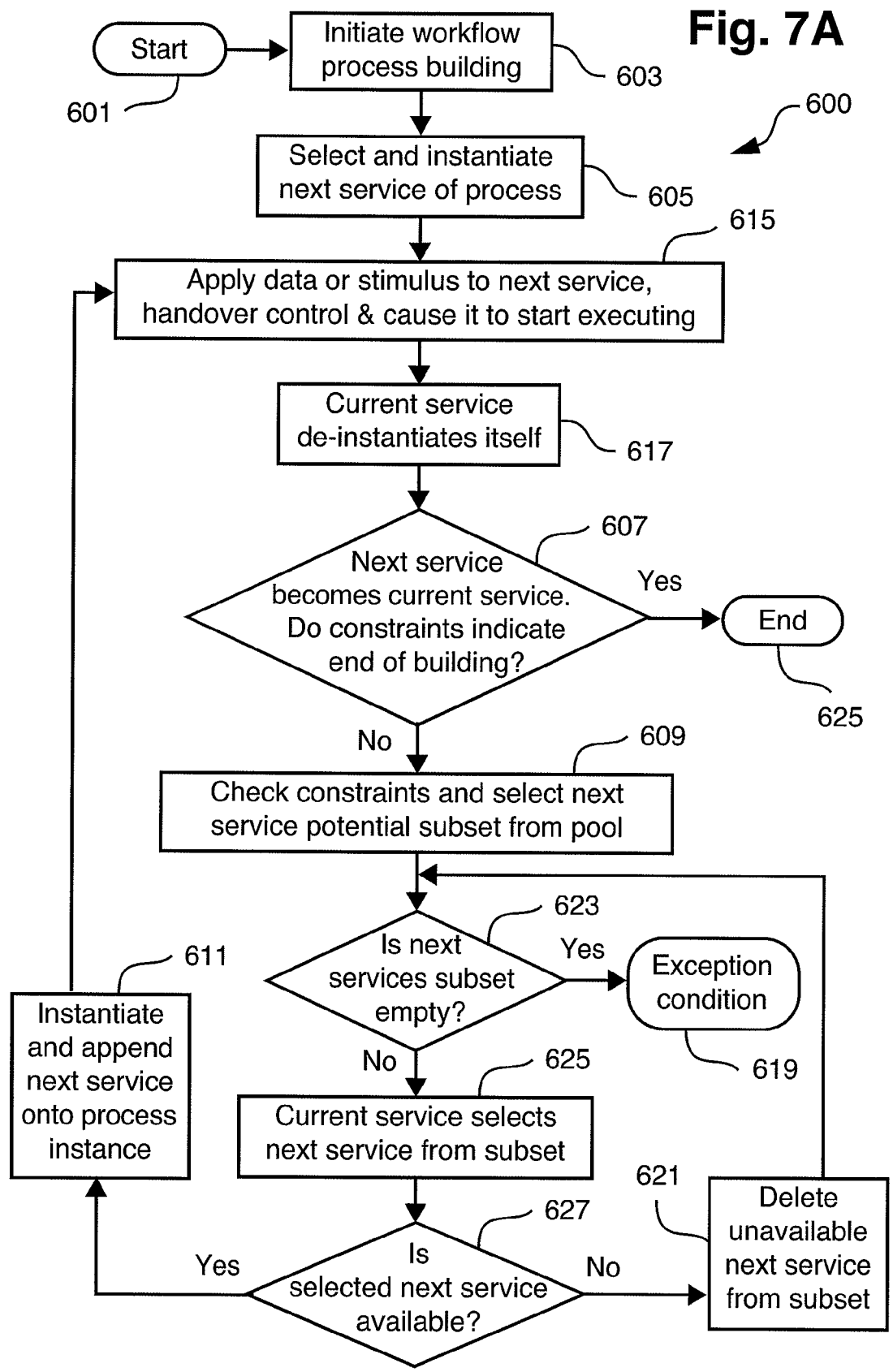
FIG. 7A is a flow diagram showing a fourth arrangement of a workflow process assembly and execution method involving two-level constraint testing.

FIG. 7A shows a JIT Workflow method 600 that supports two-level constraint testing. This method provides a more efficient separation of constraints into two levels, such as static and dynamic constraints, or template constraints and external constraints. Method 600, for instance, permits the template author to avoid the need for anticipating all external constraints of significance when authoring a particular workflow process template.

Method 600 steps 601, 603, 605, 615, 617, 607 and 625 are substantially the same as the corresponding method steps of the method 450 in FIG. 5B, namely the steps 451, 453, 455, 465, 467, 407 and 475, respectively.

When the method 600 execution reaches a step 609, the current service checks the process template constraints and selects a potential subset of potential next services from the available pool of networked services. The members of the selected subset of these potential services are informed (ie notified) at 609 that they are potential next services of the workflow (involving passing of a specific workflow ID, for instance and the URI of the current service communicating with them).

At 623 the current service checks to see if the subset of potential next services is empty. If it is empty then the workflow process throws an exception condition at 619. There are various possible actions that can be taken from this point (none shown), including a wait and retry for suitable services to appear on the network and possibly involving posting of the intermediate process data to a database for a temporary period, or self-disassembly of the workflow process (being the current service de-instantiating since all preceding services have already de-instantiated), or an exception message might be thrown to or logged by a higher authority such as an administrator's machine or similar thereby indicating that the networked service domain might not have the capability or flexibility to support the workflow process template in all cases.

If the test at 623 returns a non-empty subset of potential next services then method 600 continues to 625 where the current service makes a selection from the subset of the service or device that it prefers to make into the next service of the workflow process. This step 625 may involve further analysis of constraints such as cost, quality, etc that might have been preset in a template or by user input data.

At step 627 the current service enquires if the next service considers itself available to be appended to the workflow process. If the selected service replies in the negative to the current service, then method 600 returns via 621 where the selected service is removed from the subset by the current service and thence to 623 again. The selected service decides whether it is available based, typically on dynamic external constraints such as whether it has sufficient processing capability (given other tasks that might be underway), whether it has sufficient consumables (if a printer for example), and so on. This level of detail, and particularly this private detail can be analysed by the potential next service rather than being broadcast to the current service for analysis, thereby simplifying the JIT Workflow system implementation.

When a selected next service decides that it is available or even suitable for the requesting workflow process, it replies in the affirmative to the current service at 627 and the current service instantiates it and appends it to the workflow process at 611 and method 600 loops back to 615 where the current service provides data, etc to the next service as previously described for other JITW arrangements.

This method 600, as has been discussed, has several advantages over earlier methods. It allows partitioning of constraints such that communication of significant information between services is not required, nor is a service required to be capable of analysing unfamiliar constraint information The method 600's steps 609, 623, 625, 627 would typically require some activation of the selected next services even before those services have indicated their availability and been appended to the workflow process. There are several methods of performing this interaction and some are more economical than others. For instance, in general, it will not be necessary to fully instantiate any or all of the subset of next services between 609 and 625 in order for them to respond at 627. For example, a light-weight service manager might exist in each physical node or device that can respond on behalf of all services within these. This light-weight service manager could respond to enquiries such as those made at 609 by the current service as to which services are suitable as required by the template constraints. Then at 625 when the current service selects a preferred next service, the service manager might also respond with information that it knows about the dynamic availability of the preferred next service, again without instantiating that next service. Thus, the service manager, operating as an assembly helper, is not explicitly recognised by the current service or by the self-assembling workflow process. This implementation reduces the need for significant numbers of potential next services to be instantiated and then de-instantiated, thus avoiding the wasting of resources.

There are alternative operating modes for the method 600, including incorporation of the service manager as a support module into all services, thus having services briefly instantiated to perform this management & communication process and then de-instantiate themselves if they will not form part of the workflow process. Another alternative implementation could involve the service manager instantiating the preferred next service earlier in the method 60, at or about 615 or 617 so that the next service can make its own detailed decision about its dynamic availability based on external constraints. If the next service subsequently decides that it is not available then it will de-instantiate itself at 627 or 621 after informing the current service, perhaps via the service manager, of its unavailability.

Fifth JITW Arrangement

Figure 7B:
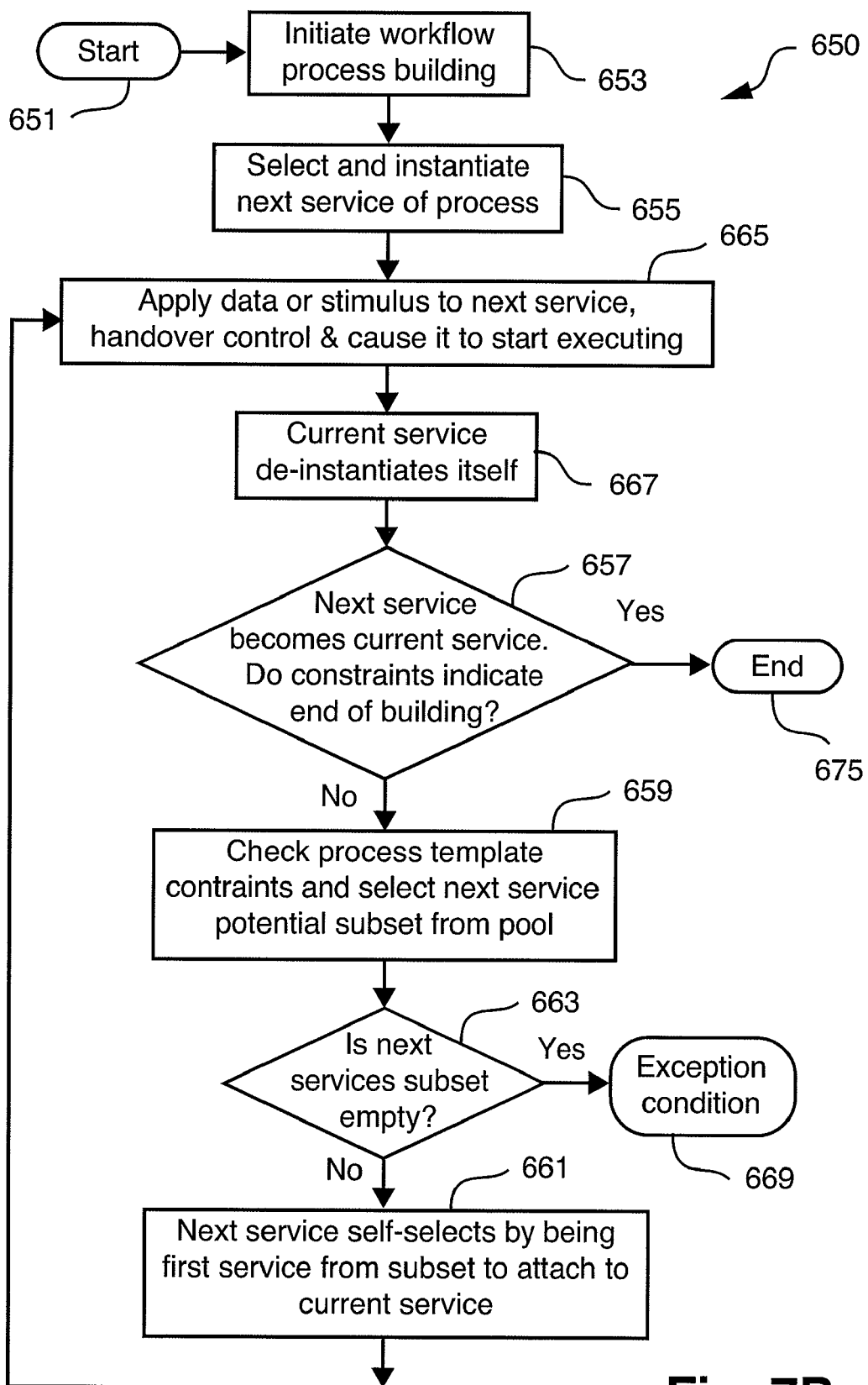
FIG. 7B is a flow diagram showing a fifth arrangement of a workflow process assembly and execution method involving service self-selection to a workflow process instantiation.

FIG. 7B, shows a JIT Workflow method, 650 that also supports two-level constraint testing and also self-selection of the next service in the workflow process. This method also provides a more efficient separation of constraints into two levels, such as static and dynamic constraints, or template constraints and external constraints. It also efficiently supports the use-case example in FIG. 6 by allowing potential next services to make their own decision about their availability for a workflow process and to self-append themselves to the workflow process requesting them.

Method 650 steps 651, 653, 655, 665, 667, 657 and 675 are substantially the same as method 450's steps 451, 453, 455, 465, 467, 407 and 475, respectively. Method 650 steps 659, 663 and 669 are substantially equivalent to method 600 steps 609, 623 and 619, respectively.

When the method 650 execution reaches the 'no' condition for the empty subset test at 663, the current service goes idle awaiting a response from one of the selected next services. In this method 650, the next services or their service managers wait for external constraints to be satisfied before they respond that they are available. For example, in the use-case of FIG. 6, the potential (in subset) next services 520 and 530 (where 510 is the current service) both await their external constraints being met. Whichever service's external constraints are met first, that service, say 520, for example, informs the current service, at 661 that it is to be the next service and therefore the next service effectively appends itself to the workflow process. Any other potential next services such as 530, must be informed that they are no longer required or will timeout and de-instantiate. There are many method of informing these redundant next services that they are not required. Explicit communication of this fact may be sent by the current service at 665 once it has received a response from the self-selected next service at 661. Or, alternatively, the self-selected next service might implicitly inform the other next services of their need to de-instantiate by broadcasting openly that it is the selected next service for the JIT workflow process ID for which it was selected. Any other potential next services recognising that JIT workflow process ID in the broadcast would then de-instantiate themselves.

Following a next service's self-selection, method 650 loops back to 665 where the current service provides data, etc to the next service as previously described for other JITW arrangements.

This method 650, has similar advantages to that of method 600. Once again, as for method 600, a service manager module or process might be useful for managing the communications for potential next services.

Sixth JITW Arrangement

Figure 8:
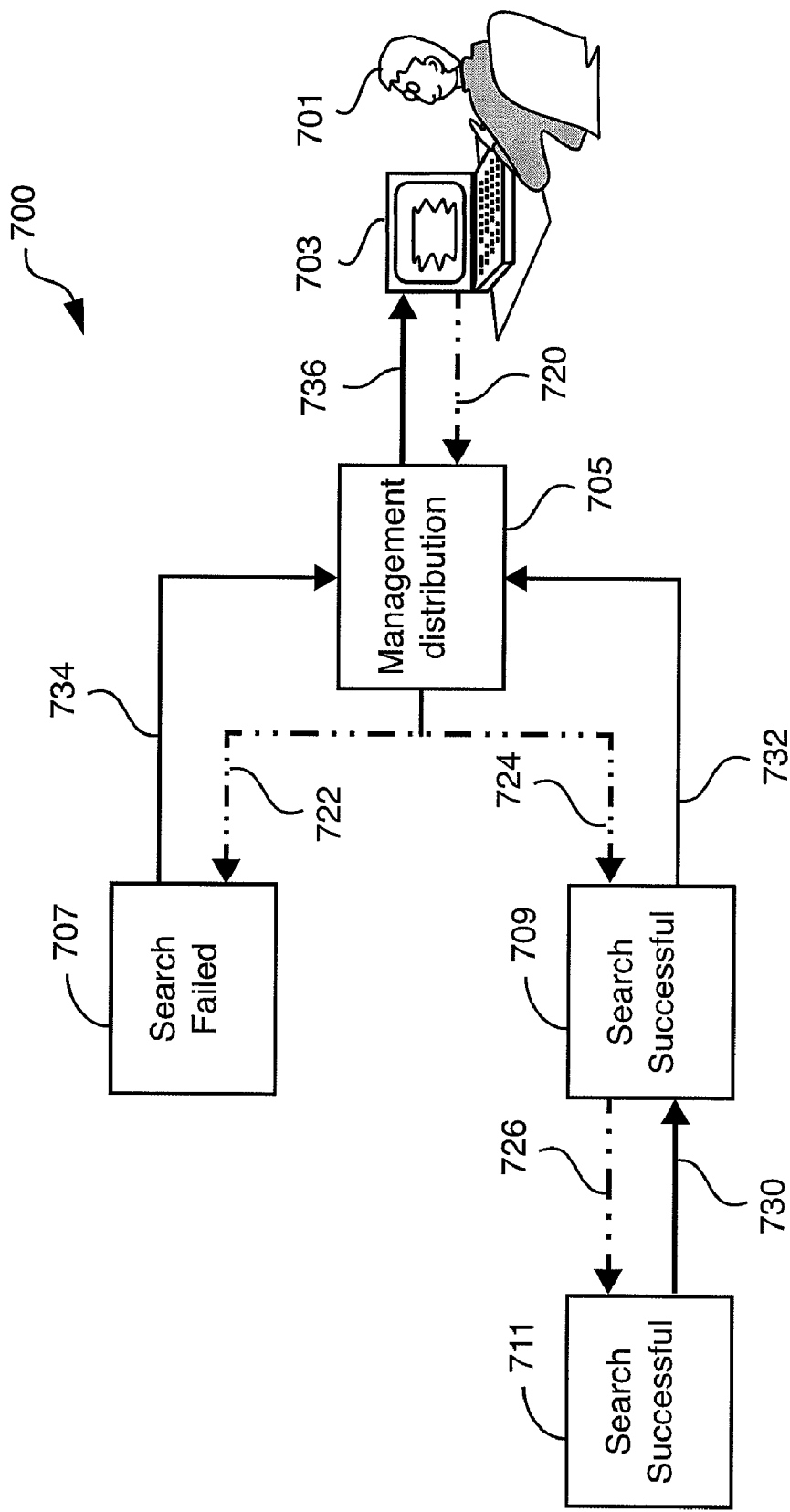
FIG. 8 shows a sixth arrangement of a workflow process 'pull' assembly-execution document search example use-case

A sixth JITW arrangement can be explained in relation to FIG. 8 which shows an example use-case of a 'pull' assembly-execution mode of a just-in-time workflow process. The term 'pull' in this context means that the workflow process execution path involving the task data path and processing order is the opposite of the workflow process assembly or command path. The previous JITW arrangements 1 through 5 were all examples of the 'push' assembly-execution mode in which assembly commands and execution process-data travelled in the same direction.

The use-case example of FIG. 8, 700, shows a distributed, hierarchical network search in which user 701 inputs a search pattern to network device 703 which initiates a JIT workflow process comprising services 705, 707, 709 and 711. Service 705 typically manages the distribution of the search and the cognation or other merging method of the results returned from other services 707 and 709. Lines 720, 722, 724 and 726 show the assembly control flow and possible parameter or search task information passing in the workflow process assembly phase. Service 705 identifies appropriate network master index search services 707 and 709 based on template and external constraints (e.g. search criteria entered by the user, user access rights to database servers, etc). Note that service 711 is internal to the device presenting service 709 to the network. In fact, service 711 is not visible to the network and service 705. Service 709, when requested to assemble into the workflow process by 705, offloads some of the search task requested of it to sub-service 711. Service 705 also requests a search by service 707, the latter performs the search of its database master index and returns failed or not found or no matches status via 734 to service 705.

Service 709 was successful with its master index search, however, rather than immediately communicating its results to 705, it, as mentioned, offloads a more detailed search to service 711 via 726. Service 711 returns its detailed search results (successful in this example) via 730 to service 709, which may cognate those results with any of its own and forwards this data set via 732 to service 705 which then cognates the results with those of other search services (if applicable) and forwards the result via 736 to 703 and user 701.

This use-case example shows how the assembly and execution phases need not follow identical directions in the assembled workflow process. This use-case shows an example of a 'pull' method in which the commands (typically used for workflow process assembly) and the result data travel in differing directions. As can be seen in the use-case example of FIG. 8, 700, the processing occurs at 709 before it does at 711, which is the same direction as the assembly phase, but the data returns from 711 through 709 to 705, etc, in the reverse direction to the assembly phase. This behaviour can be implemented using a modified version of method 400 of FIG. 5A, for instance. The previously-explained behaviour of 400 remains with the exceptions that in 415, the search keywords are passed down through the workflow assembly phase, but no process data is included as it has not been generated yet. At 407, the last service in each branch of the workflow process 707 & 711 detect that they are the final steps. At 421, each of the last services, instead of signalling the initiator, under the instruction of the workflow process template, checks its constraints, potentially executes its processing, and returns the results up the workflow process chain to the preceding services in each case. These behaviours, as opposed to the original behaviour of 400, can be set out in the workflow process template and thus do not require any special modification of individual services, providing the benefit, one again, of generality in the network service pool. Subsequently, when the initiator, 703 via 705 receives the replies from one or more branches within the workflow process chain, it can signal the branch of services to de-instantiate in the normal way 150 such as in FIG. 2C.

Device Behaviour

A method 900 according to the disclosed JITW arrangements is explained in relation to FIGS. 9(*a*), 9(*b*) and 10. The method 900 (see the process fragment in FIG. 9(*a*)) shows the execution flow on a device involved in the JIT workflow process. Each device (or service) in the network pool available for inclusion in a workflow process instantiation is expected to execute the method in 900 to manage the inclusion or chaining of the device and its specific contribution (functionality) to the workflow process or chain. The method 900 supports inter-communication between devices such that workflow process assembly and execution can take place as an emergent property of the inter-communicating services.

In one segment of this example, the job is pushed along the chain of devices (referred to as 'push' execution mode), so that as each device completes its sub-job, it transfers the job data and execution control to the next device in the chain.

In another segment of this example (referred to as 'pull' execution mode) the job is transferred to the next device in the chain only when the next device requests that it be transferred. For example, a printer device may not have sufficient resources to store multiple jobs, and therefore would request each job from the workflow chains as it is ready to print another document.

Comparing the method 900 to the sixth JITW arrangement illustrated in FIG. 7B, step 905 is substantially the same as step 653, step 915 is similar to step 663, and step 909 is the same as the second part of 657, which tests for an end of the workflow. Steps 911, 913, 915, 917, 919, 921, 923, 925, 927, 929, 931, 933, 935, 937 correspond to 661, a method of self-selection of the next service to attach.

The device performs start-up and initialisation steps, 901, then enters state 903 (see the process fragment in FIG. 9(*b*)), awaiting command stimulus. The command stimuli can include some device-based, software-based or user-based event. The device performs actions in response to different command stimuli.

On receiving an 'External Job Start Stimulus', the device builds a new job and initialises the workflow chain at step 905, then in step 907 invokes a "Chain Propagate" stimulus on the device.

'Chain Propagate' command stimulus initiates actions beginning with step 909, which involves a test to see if the workflow building process is completed. As with method 100, this test is performed using the constraints known to the building process to see if completion criteria are met. If the test at step 909 is false, execution proceeds to step 911 at which point the instantiated device establishes accessible devices in the network pool that have the ability to form the complete chain. Note that this complete chain is tentative, as each device in the chain will perform this step and can re-route the chain depending on environment current at the time the device is called upon to continue the chain. Each accessible device identified in step 911 is then queried in step 913 to test their own suitability by means of posting a "Suitability Enquiry" stimulus command to each accessible device. At step 915 the current device waits for the results of this request, either at 917 posting an "Availability Indication" to a selected subset of devices that responded to the suitability enquiry with a suitability indication, or killing the workflow and returning to 903 to await further stimuli. Killing the workflow can involve reporting of exception or error condition. If an "Availability Indication" was posted in step 917, then the device waits at step 919 for one of the devices identified as suitable to post a "Chain control request" stimulus. If no stimulus occurs, the workflow is killed. If a "Chain control request" stimulus does occur, step 921, posts a "Chain Propagate" stimulus for the device identified in Step 919. Step 923 then executes the sub-job on the current device via creating a "Sub-job Execution" stimulus.

If the test at step 909 is true, that is, the current device is the final workflow device, execution proceeds directly to Step 923, bypassing the steps which propagate the chain to subsequent devices in the workflow.

Step 925 is invoked on each 'next device' in response to a "Suitability Enquiry" stimulus posted at step 913 by the current device. Each 'next device' negotiates static suitability of itself against a set of constraints imposed by the workflow process being built. If the test at Step 927 yields that the device is suitable then the device responds at 929 posting a "device suitable indication" to the current device, indicating that it is suitable. Otherwise processing on the 'next device' is returned to the wait state in Step 903.

Step 931 is invoked on the device in response to an "Availability Indication" stimulus posted at step 917. At Step 931 the device confirms its dynamic availability against a set of constraints and some trigger stimulus condition. If the test at Step 933 yields that the device is available, then the process waits for the internal or external stimulus triggered in Step 931, otherwise processing on the 'next device' is returned to the wait state in Step 903. When a stimulus is detected at Step 935, the 'next device' then decodes and requests the control of workflow process chain, then returns to the wait state in Step 903. As previously mentioned, posting the "Chain control request" at step 937 is the condition upon which the current device is waiting in Step 919.

Receipt of a "Job Request" stimulus by the current device, from a next device indicates that the next device is ready to receive and process the job. The current device begins at step 939 (see the process fragment in FIG. 10), which checks whether the workflow process is constrained to a 'push' or 'pull' execution mode. If the test yields that the workflow process is a 'push' execution system, the device is returned to the wait state in step 903, as the job has or will be sent when the sub-job finishes at the previous device (step 957). Otherwise the process is a 'pull' execution system and the device waits for completion of the sub-job at step 941 before posting the job to the next device at step 943.

The invocation of the workflow process, via "Sub-job Execution" stimulus as invoked on the current device by step 923, initiates the job request check at Step 945, where again the device checks whether the workflow process is constrained to a 'push' or 'pull' execution mode. If the check yields the 'pull' execution mode, step 946 checks whether this device is first in the chain. If it is, then it already has the job information so the device proceeds to step 951 to execute the sub-job. Otherwise, the device first posts a "Job Request" stimulus in 947 to the previous device then waits for the job information at step 949. If it does not receive the job under certain conditions, the device can kill the wait and return to step 903 for further command stimuli. On the other hand, if the device does receive the job, it again executes the sub-job at 951.

Alternatively, if the check at Step 945 yields the 'push' execution mode then the workflow process sub-job task is executed at Step 953. Step 955 checks whether the current device has fulfilled the workflow process' requirements, that is, whether it is the final device in the workflow chain. If not, it sends the workflow process execution control to the 'next device' on the workflow process chain. The device then returned to the wait state in Step 903.

Workflow Process Template

The previous JITW arrangements one through six were described as utilising a workflow process template to describe constraints on the workflow assembly method. It is also possible to implement the disclosed JITW arrangements utilising a distributed workflow process template, i.e. where a particular workflow process is described by a group of documents or document parts.

The method 900 uses a distributed workflow process template concept. Each device or service contains or references its own workflow process template fragment. Examples of distributed workflow process template fragments are shown in Appendices A, B, and C for a portion of an exemplary purchase order workflow system similar to that shown in FIG. 6 and executed by a method such as 900 in FIGS. 9(*a*), 9(*b*) and 10.

Appendix A shows an exemplary workflow process template fragment utilised by a PDA device belonging to a network pool of devices capable of being integrated into one or more types of workflow processes. The template fragment is written in XML format following a suitable schema (not explicitly defined here).

The template fragment for the PDA begins with line 3, tag <JITconfiguration> indicating that the following XML content is relevant to a Just-in-Time workflow system device. At line 5 the device type(s) is(are) declared for which the template fragment is relevant.

Between lines 7 and 12 the workflows to which the device can respond and become involved in are listed, between the workflows tags. The two workflow examples shown are for a staff purchase, similar to that shown in FIG. 6 and a document search, similar to that shown in FIG. 8. Lines 8 & 9 describe the workflow name, description and initial and final services for the staff purchase workflow. Similarly lines 10 & 11 describe the same features but for a document search workflow.

The capabilities of the device within the specified workflows are described between lines 14 & 23 in the capabilities section. Lines 15 & 16 describe the 'User Input Form' capability of the PDA within the Staff Purchase workflow and bind this capability to a form found in a workflow database on the network. This capabilities description indicates to the PDA what function to execute (bind) when it is performing the User Input Form step in a Staff Purchase Workflow. Similarly, three other capabilities are described and bound, one more for the Staff Purchase, and two for the Document Search workflows.

Figure 9B:
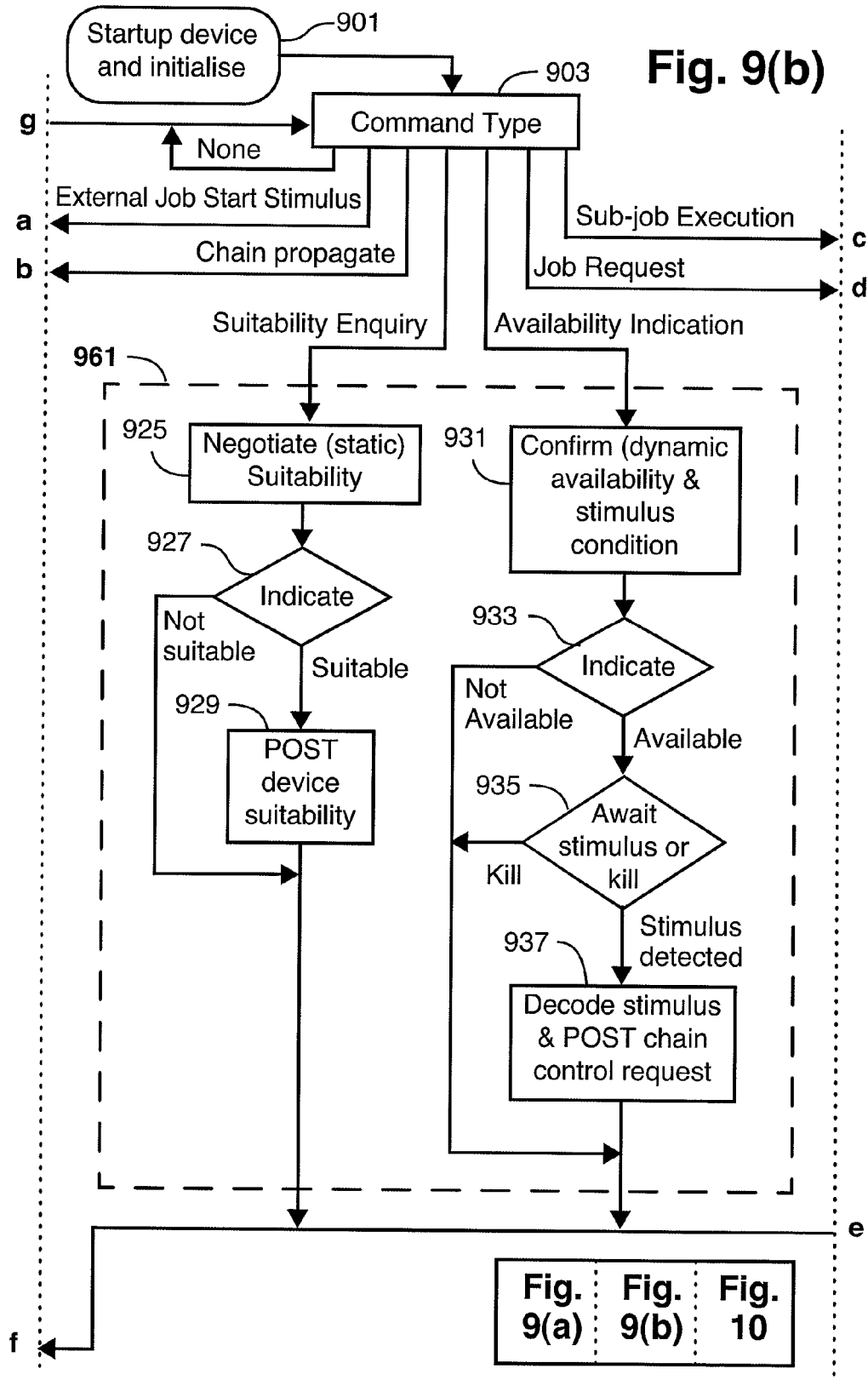

The transform section of lines 25 to 34 indicates the next step of a workflow process subsequent to the current device's activity in a specified workflow. So, for example, if the PDA is performing the initial User Input Form step of the Staff Purchase workflow, then lines 26 & 27 describe to it that the next step it should request of the network pool of devices is an Attach Quote step. Therefore, a workflow process system can be built incrementally by a pool of devices obeying the constraints in their workflow template fragments and using a method of execution and inter-communication such as is shown in FIGS. 9A, 9B, method 900.

Appendix B shows a workflow process template fragment for a scanner device that may participate in a staff purchase workflow such as shown in FIG. 6. The details are similar to those shown in Appendix A, with specific entries for the scanner device in the capabilities section, lines 12 through 15, which define the Attach Quote function that can be executed by the scanner and is bound to the scan.exe executable. Also, the transforms section, lines 17 through 20 shows that the next step after Attach Quote is the Print Order step. It may be seen that both the PDA device type and the scanner device type may execute an Attach Quote capability leading to a Print Order step in a Staff Purchase workflow, thereby enabling the alternative workflow routes shown in FIG. 6.

Appendix C shows an exemplary workflow process template fragment for a printer that can participate in the staff purchase workflow process. The capabilities section, lines 12 through 15 shows that the printer can perform the Print Order step and is bound to the print.exe internal function. The transform section, lines 17 through 20 shows that the printer should end the workflow process after execution of its Print Order step.

It can be seen that the contents of each of the workflow process template fragments in Appendices A, B and C, being 'workflow', 'capabilities' and 'transforms', applicable to specific device or service types, provide the template constraints information described in various versions of this disclosed JITW arrangements. When taken together, for instance, the workflow process template fragments and the specified devices or services that they instruct, utilising the specified template constraints, cause the formation of an emergent workflow process instantiation.

The external constraints mentioned previously in various versions of the disclosed JITW arrangements are exemplified by events such as the 'submit' button implied within the html form that is bound to the PDA's User Input Form capability in the Staff Purchase workflow, and also exemplified by the scan event (user pressing scan button) implied and expected within the scan.exe function bound to the scanner's Attach Quote capability in the Staff Purchase workflow.

Thus, it can be seen how a workflow process template, in a single, centralised form or in a distributed, fragmented form, can control the assembly, execution and disassembly of a Just-in-Time workflow process system and can, in conjunction with a method such as in FIGS. 9(a), 9(b) and 10 or other of the JITW arrangements described herein, enable or support the features described for such a workflow process system, particularly including zero-notice constraints, significant flexibility to support real-world requirements, and a distributed workflow engine.

Computing Charges for the Just-in-Time Workflow

Figure 11:
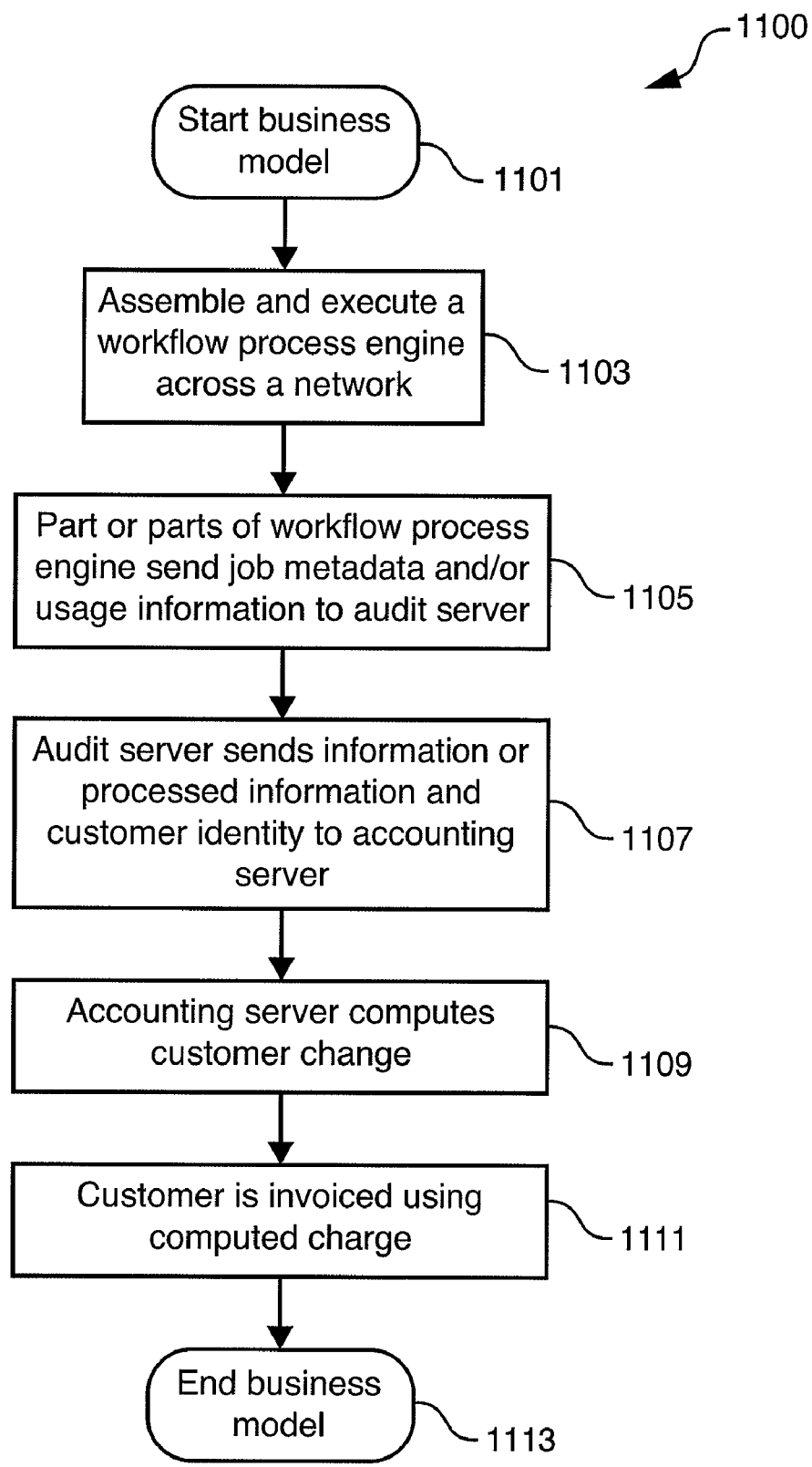
FIG. 11 is a flow diagram showing a business model arrangement of the disclosed JITWC arrangement.

FIG. 11, method 1100 shows an embodiment of the disclosed JITWC arrangements. The method begins at 1101 and proceeds to 1103 at which a workflow process engine is assembled and a workflow process executed across a network. Examples of step 1103 are provided as methods 400, 600, or 650. Method 1100 proceeds then to step 1105 at which parts of or all of the network-distributed workflow process in the list of services sends job information (metadata) and/or usage information to an audit server. The means of sending this information is well-known in the art, using any of a number of network protocols, for instance, particularly including secure protocols and/or encrypted metadata. The type and form of job metadata that is sent to the audit server may include any parameters about the services or devices operations, commands or parameters, the quantity and quality values (eg type of service, quantity of data processed and/or information about the data processed), and particularly, information about aspects of the content of a job or information about the type of processing that job content requires. Some examples of these kinds of parameters and their usefulness to accurate job accounting are given in Table 1 for several workflow contexts.

Step 1105 may be interleaved with step 1103 so that each service of a workflow process is involved in sending job metadata to the audit server as the service is assembled into or executed within the workflow process engine.

At step 1107 the audit server, which may be typically resident in the customer's network, sends collected information to the vendor's accounting server. The audit server may be replicated several times within a customer's network for convenience, security or partitioning reasons such as workflow and network topology. The audit server(s) may process the collected job metadata prior to sending it to the accounting server. The form of processing at the audit server could vary per customer if the vendor wishes. Examples of processing might include normalisation of information into standard units as received from differing services, workflow processes, etc. It is optional as to whether the vendor prefers some processing at the audit server or at the account server. The more processing at the audit server, the less flexibility the vendor might have to vary charging models and values, however, the less information (in terms of volume but not in terms of value) may need to be sent to the accounting server.

At 1109 the accounting server, which may be at the vendor's premises or typically in a secure location outside of the customer's premises, the customer charge is computed. Then at 1111 the customer is invoiced according to the computed charge using any of the known methods. At 1113 the business model ends. As will be understood by a person skilled in the art, steps 1107, 1109, 1111 may involve some form of caching of information across multiple execution of steps 1103 & 1105 and thence less frequent execution than steps 1103 & 1105.

Although the previous description assigns different tasks to the audit server and the accounting server, it is apparent that the noted tasks can be allocated in different ways in the JITWC arrangements. Furthermore a single server (referred to as a server) can perform all the tasks performed by the audit server and the accounting server.

Figure 13:
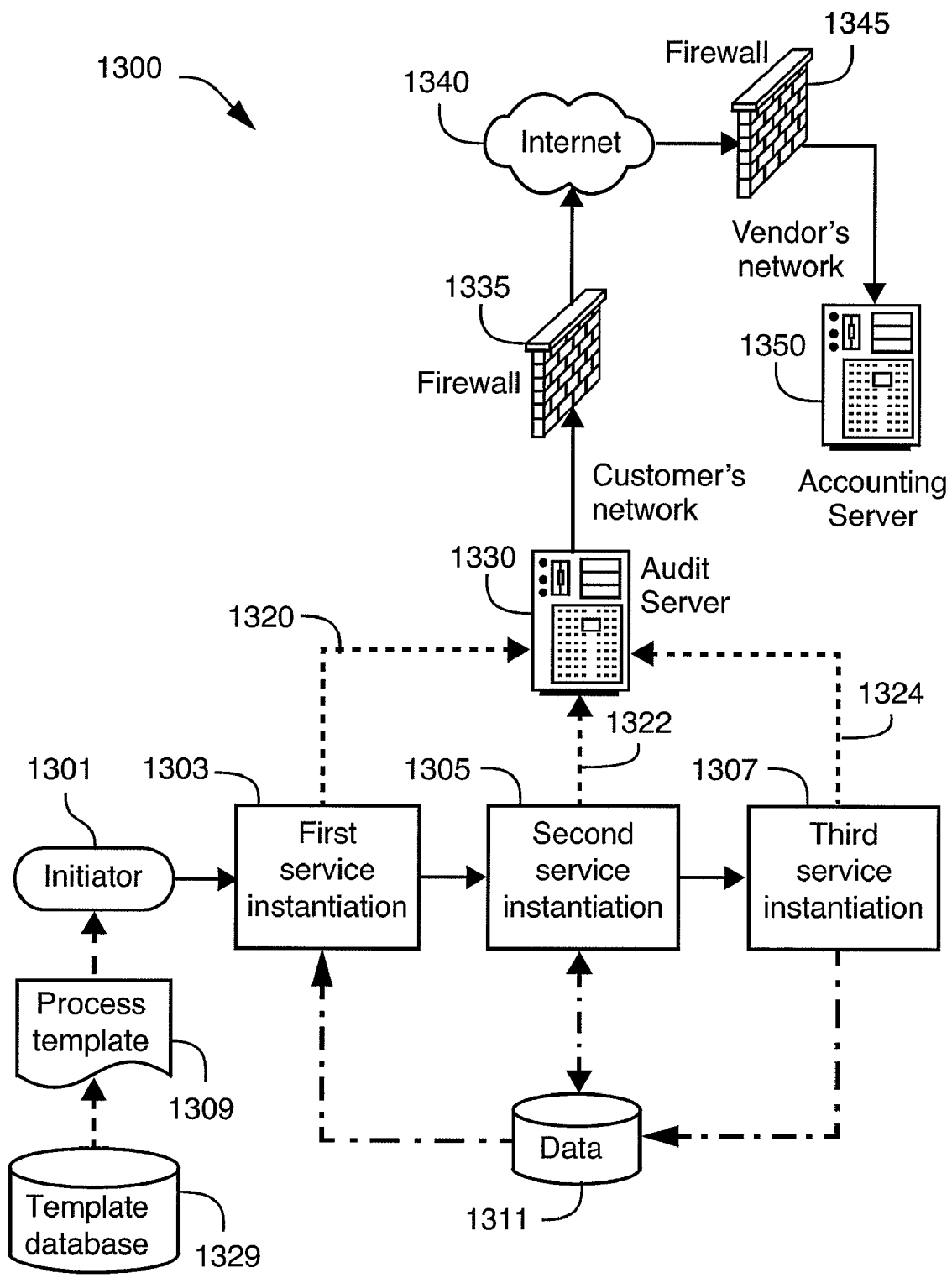
FIG. 13 is a system diagram showing workflow process, audit server and account server exemplary interconnections.

FIG. 13, 1300 shows an exemplary system in which the disclosed JITWC arrangements may be deployed. The workflow process components 1301, 1303, 1305, 1307, 1309, 1311, and 1329 perform similarly or identically to those items 201, 203, 205, 207, 209, 211, and 229 described for FIG. 3. However, in 1300, some or all of the items 1301 through 1307 may provide job metadata information to the audit server 1330 via network connections 1320, 1322 or 1324. The audit server 1330 will send job metadata or processed job metadata to the accounting server 1350. These servers would typically be located in differing networks and the connection would typically be via the internet 1340 but could be via a special dial-in line or other private network connection. It would also be typical for each network to be protected by firewalls 1335 and 1345. The method of communication between the audit server and the accounting server would typically be some form of encrypted, standard internet protocol such as https or other. The audit server might be polled by the accounting server, or vice-versa as may be desired by the implementor.

Figure 12A:
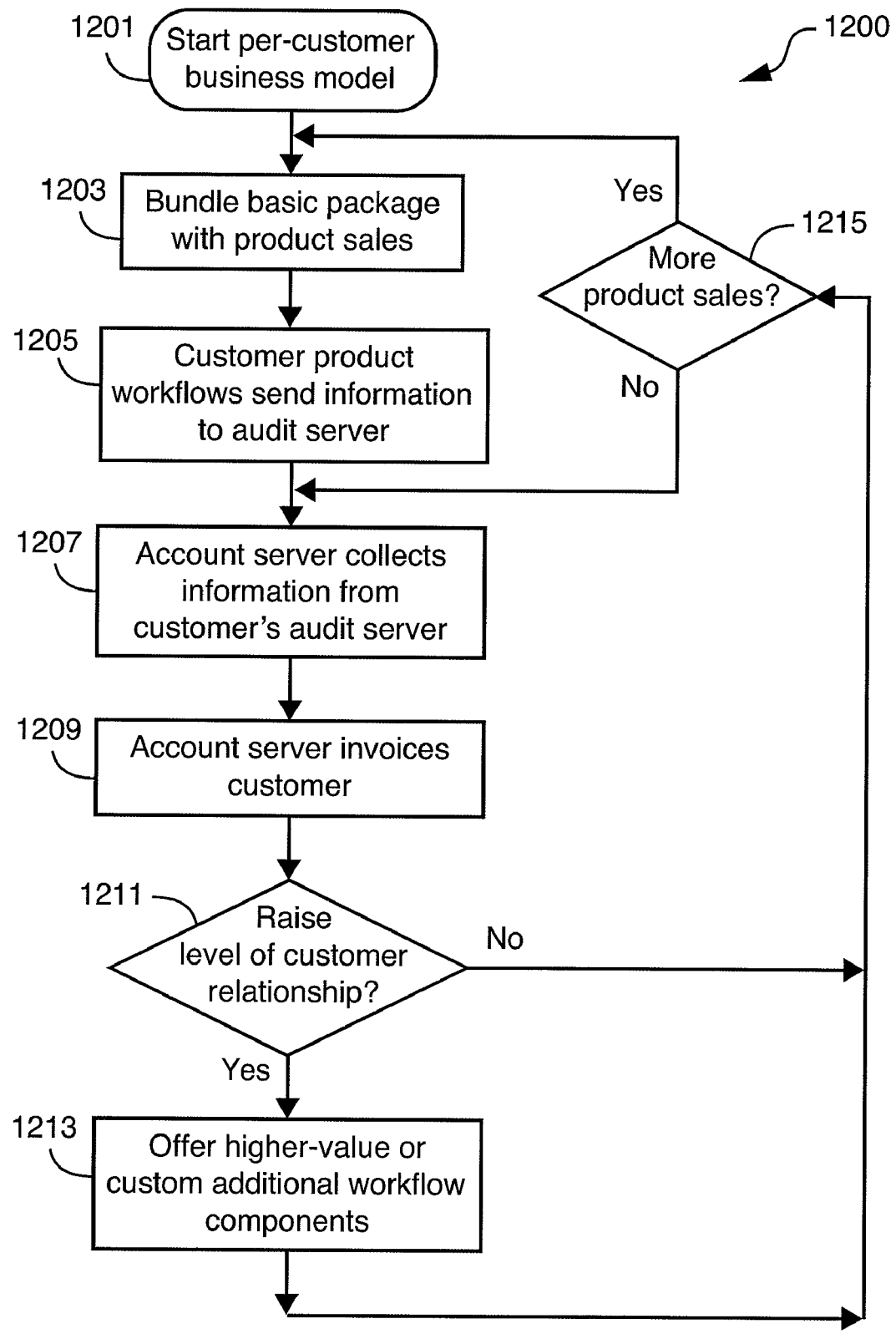
FIG. 12A is a flow diagram showing a basic business model deployment method.

FIG. 12A, 1200 shows a method for a basic deployment of the business model for deploying the disclosed JITWC arrangements. The method starts at 1201 and at 1203 the vendor bundles a basic workflow process package with product sales. For example, a photocopier, printer or other device would have bundled with it and/or within it a number of services that collaborate to form a networked workflow process as described in the JITW arrangements with reference to FIGS. 1 to 9. An option for the vendor might be to include or exclude an audit server with this basic deployment. Excluding an audit server and subsequent accounting of the service or workflow costs might be a useful loss-leader strategy for some market segments. However, it would be most useful and typical for an audit server software implementation to be included in the basic bundling with one or more products sold to a customer. In a small office environment perhaps the audit server might be integral to a device or devices to make the installation effort and cost more attractive to the small customer.

At 1205 in 1200, the workflow process-to-audit server job metadata flow occurs as previously described in FIG. 11 and at 1207 the accounting server collects the audit server information as previously described. At 1209 the account server causes the customer to be invoiced as previously described in FIG. 11. At 1211, the vendor decides whether the conditions are right to raise the level of the relationship with the customer. If the decision is not to then execution of 1200 proceeds to 1215 at which if more product sales occur then the bundling process is repeated from 1203, otherwise 1200 proceeds to 1207 where the billing process continues for the customer's usage of the installed product(s) and workflow/service bundle(s). If, at 1211, the vendor decides to raise the level of the customer relationship then at 1213 the vendor offers higher-value or customised services or devices as workflow components. It would be expected to be the case that these higher value components would be billed at higher rates per usage or per other parameter than would the basic components. In addition, the vendor would expect a reasonable rate of usage of these components to provide a return on the investment of developing them. Thus, the decision at 1211 takes these and other issues into account.

Figure 12B:
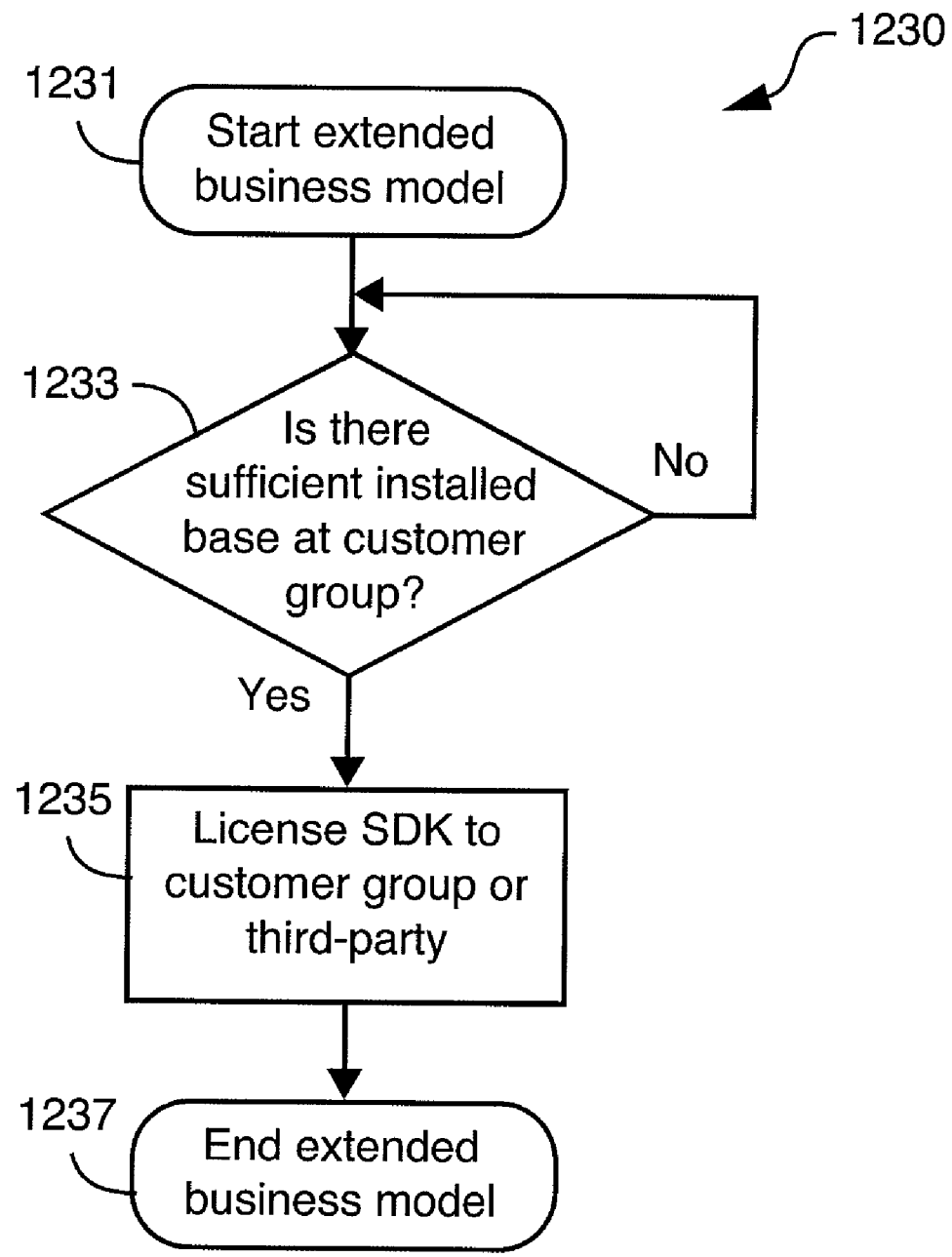
FIG. 12B is a flow diagram showing an extended business model deployment method.

FIG. 12B, 1230 shows an extended business model deployment method. Starting at 1231, the method moves to 1233 at which the vendor decides if there is sufficient installed base in a customer group (which might be a vertical or horizontal market segment or a sufficiently large individual customer). If the decision is no then 1200 loops to 1233. If the decision at 1233 is yes then the vendor, at 1235, licenses a Software Development Kit (SDK) to a third-party or to a customer for creation of services or service components compatible with those deployed within a workflow process bundle. Typically the vendor would maintain proprietary elements within the SDK that enforce standard and secure communications, auditing and other features to the vendor's required level of quality. It is expected in this model that the service components of a workflow process would include job metadata auditing methods that allow a vendor to charge a customer for the use of these services/workflow processes, even though the vendor did not itself create these components. The extended business model ends at 1237. The vendor may of course charge the third-party in some way for use of the SDK in addition to an up-front purchase cost or rental fee (not shown).

Thus, with business model method 1100, and deployment methods 1200 and 1230, and the underlying workflow methods, the vendor has many options for deciding charging models for customers, customer groups, market segments, sales strategies, etc, etc. The vendor also has sufficient control and accurate information that enable accurate billing of customers. It is feasible that customers may have preview access to such billing (not shown) so that they may anticipate the cost of any intended workflow process or service and consider its worthiness against other factors and constraints prior to activating or completing the workflow process or service. Such a method would require one or more of a cost estimation service provided by the audit server, or a cost quotation feedback service provided by the accounting server, or similar or equivalent methods.

Securing and Certifying the Workflow Process

Figure 14:
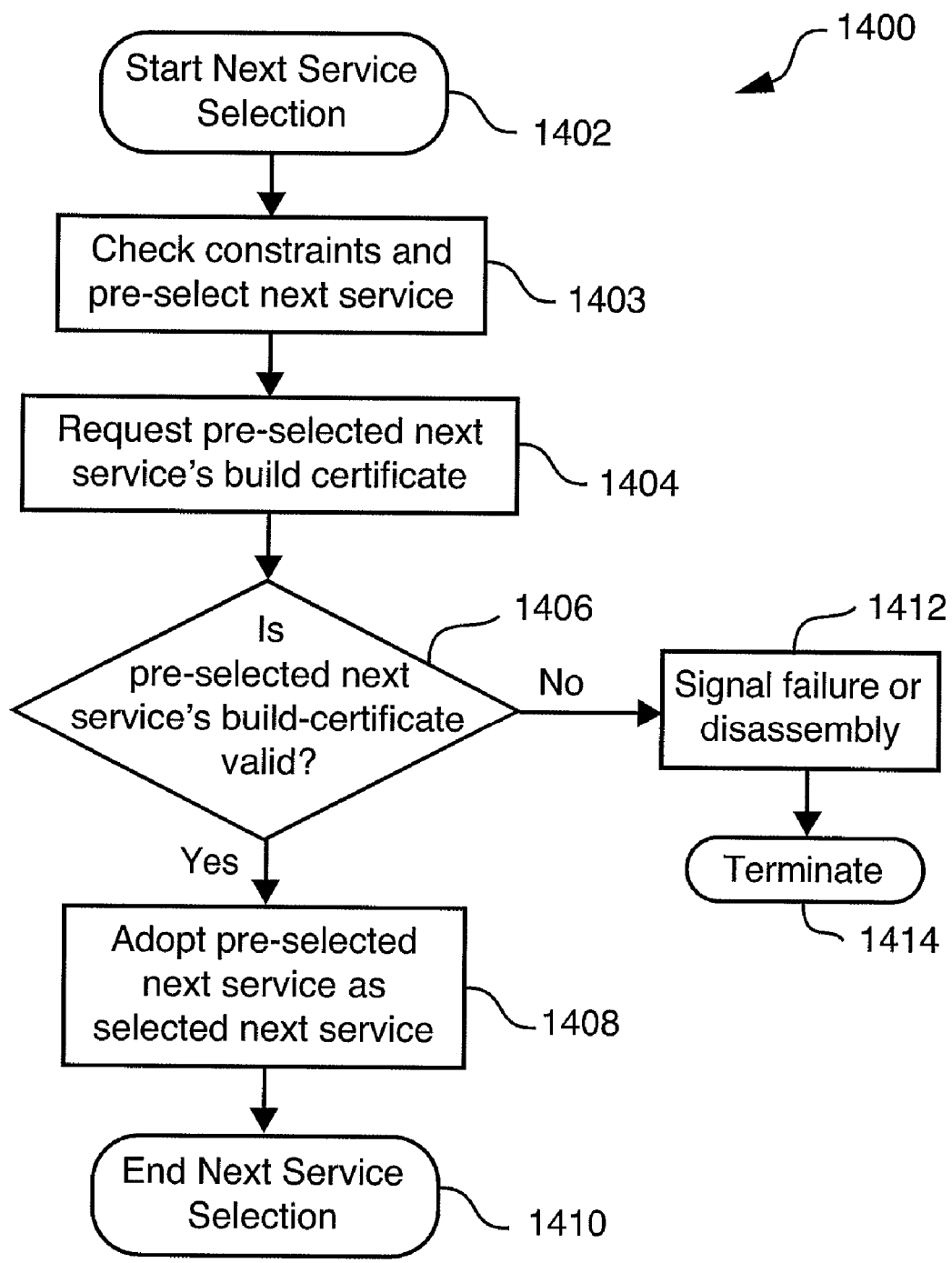
FIG. 14 is a flow diagram showing a method of workflow process service assembly with certificate check.

FIG. 14 shows a method 1400 for improving the security of the workflow process assembly method 100 of FIG. 2A. Method 1400 replaces step 109 and the next service selection portion of step 105 of method 100 in order to check certification of the next service selection in the workflow process assembly. In FIG. 14, the next service selection starts at 1402, and at 1403 the next service is pre-selected based on a constraint check in the equivalent manner to that previously explained for 109 in method 100. At 1404 the pre-selected next service's build certificate is requested. This build certificate may conform to the well-known security certification methods provided by certification authorities and based on technologies such as public key encryption and signing. In this explanation the build certificate and other certificates and verification procedures are assumed to conform to or be equivalent to the known methods.

At 1406 in FIG. 14, the next service's build certificate is verified. This step may typically involve any of several well-known methods of using a private key hidden within the current service to verify the public key of the next service, or securely accessing a private key stored on a secure server within the workflow process system network environment or on a vendor's secure server external to the customer's network environment, or by the current service performing a secure, remote verification transaction request on the next service's build certificate to a verification authority service. If the next service's build certificate is detected as invalid at 1406 then at 1412 the assembly process signals a failure and/or signals a disassembly of the incomplete workflow process such as is available in FIG. 2C method 150. An alternative mode of operation (not shown) in the case of failed verification at 1406, is to loop from 1406 to the next service pre-selection step 1403 and therefore perform this loop until build certificate verification succeeds at 1406 for a pre-selected next service or all pre-selected next services failed verification at which point 1412 will be executed and the method 1400 terminated at 1414.

If, at 1406 the next service's build certificate was verified then at 1408 the next service is adopted as the selected next service and at 1410 the method completes. The possible purposes of such certification checks include such as, ensuring that genuine services only are included within a workflow process instantiation.

Figure 15:
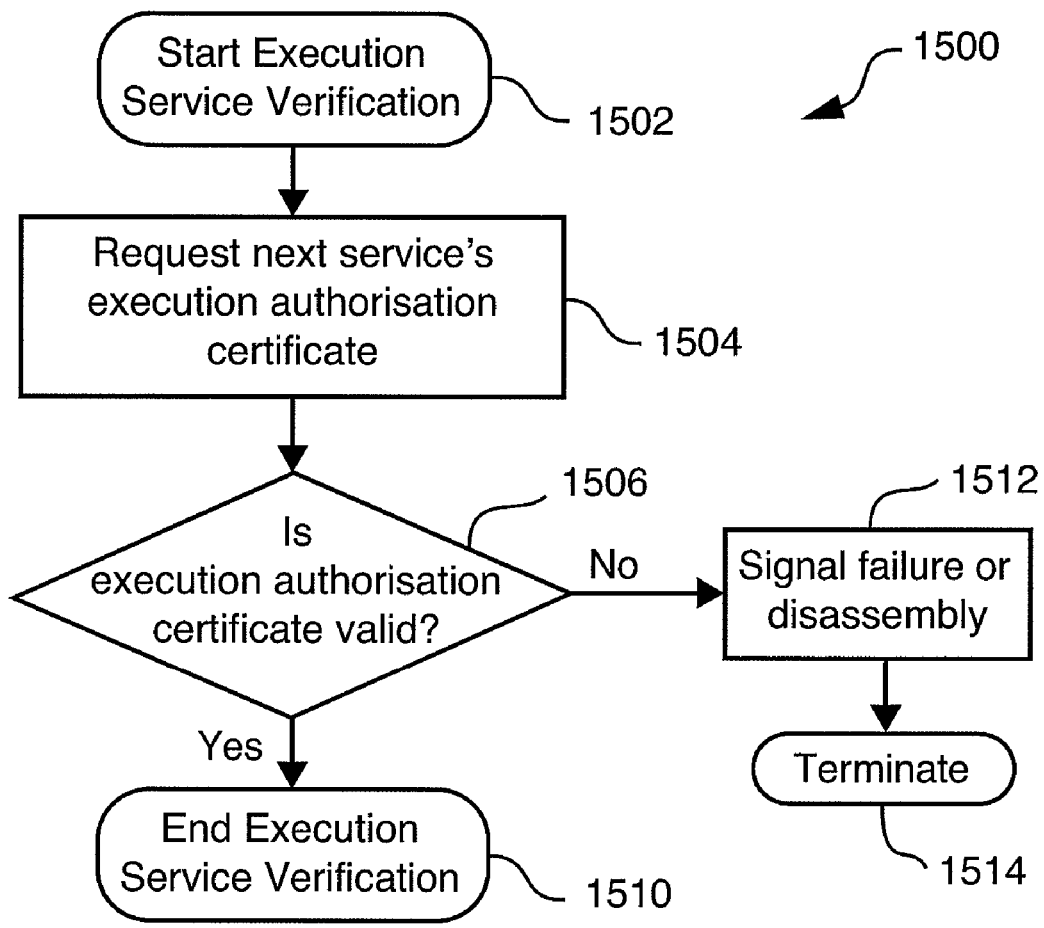
FIG. 15 is a flow diagram showing a method of workflow process service execution with certificate check.

FIG. 15, method 1500 shows a method for a current service of verifying the execution authority of a next service in an assembled workflow process. This method 1500 could be inserted between steps 134 & 136 in method 130 of FIG. 2B to verify the authenticity and security of any next service assembled into a workflow process before executing the service. The purpose of such a check might be to ensure that a customer is only using vendor services to which it is authorised to access, or a department or employee of a customer is similarly authorised to request execution of such a service.

The execution service authentication of the next service begins at 1502 and at 1504 the next service's execution authorisation certificate is requested in much the same manner as for the previous method 1400 requesting the pre-selected next service's build certificate. In fact, one certificate could be used for both build and execute authorisation. If, at 1506, the next service's certificate is not verified then at 1512 the workflow process is disassembled as per a method such as 150 in FIG. 2C and method 1500 terminates at 1512. If, however, the next service's execution certificate is verified at 1506 then method 1500 ends successfully at 1510.

Figure 16:
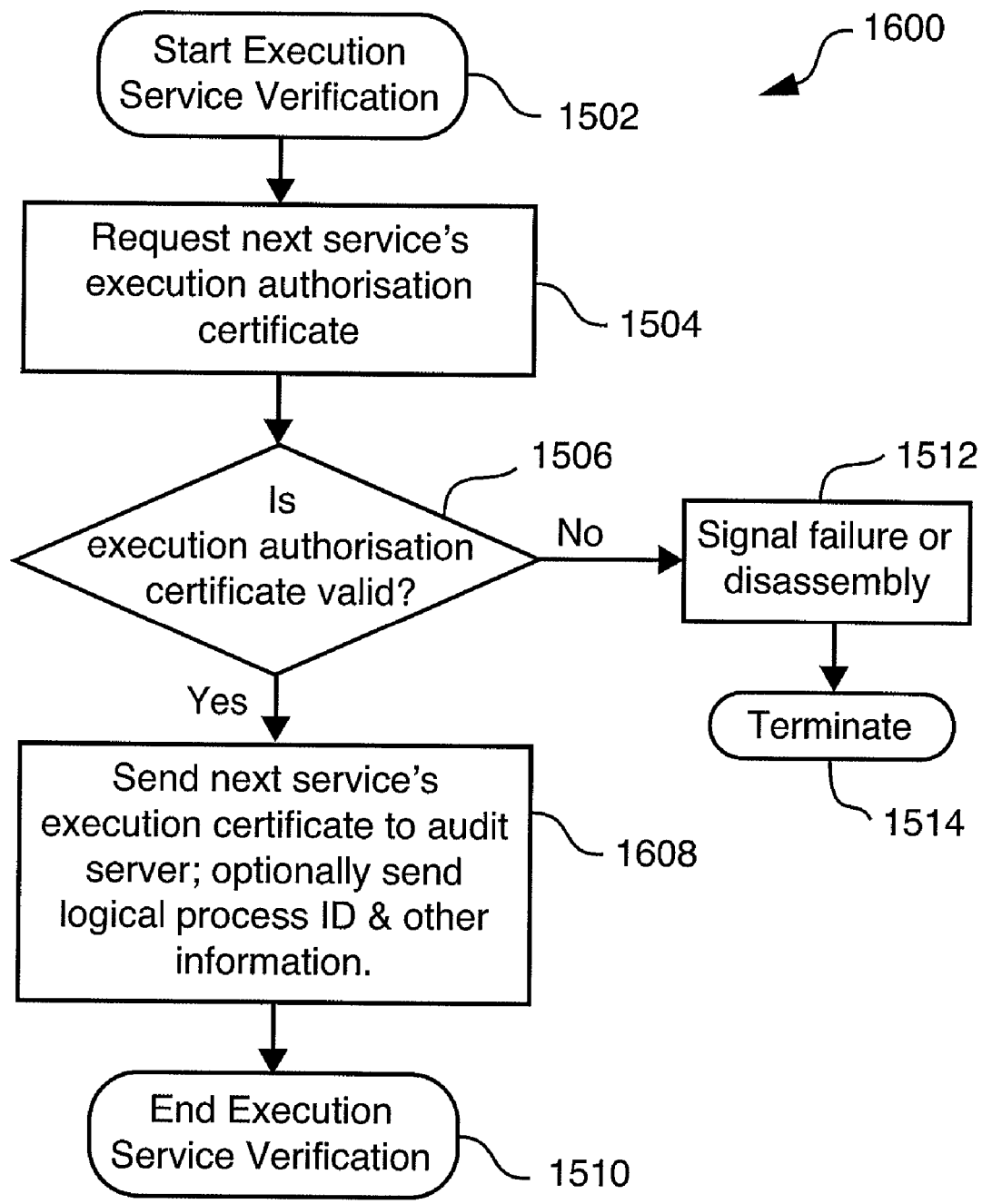
FIG. 16 is a flow diagram showing a method of workflow process service execution with certificate check and audit record.

FIG. 16, method 1600 shows a variant of the method 1500 of FIG. 15 in which most steps are identical excepting the insertion of step 1608 as shown. The purpose of method 1600 and of step 1608 is to create an audit log of the particular instantiated workflow process' execution by recording specific information including, particularly, a secure identifier of the next service occurring in the instantiated workflow process, and this is done by providing a record of the next service's execution certificate if this certificate is unique. It is possible that several services might have identical execution certificates and in that case the implementor of the business method may decide whether to discriminate between the services or not and if to discriminate, then another secure identifier such as hash signature of the service software or other needs to be provided to the audit server.

Other information may be advantageously provided at 1608 in 1600 to the audit server. Typically, metadata about the job being undertaken would be provided to the audit server and this might include information such as: date & time of the job execution, information about the user or access rights for the job initiation, copies of job parameters passed to services, information about the applicable workflow template, a template hash signature or certificate for the workflow, information derived by a service from its execution, such as number of pixels of particular colours in an image, or other quality and quantity information and also parts of, or special derivations of the content of the job passed to one or more of the services in with workflow process instantiation.

After this information is passed in a secure manner to the audit server by 1608, method 1600 proceeds to and ends at 1510.

Workflow Process Template Certification and Instantiation Logical ID Generation

Figure 17:
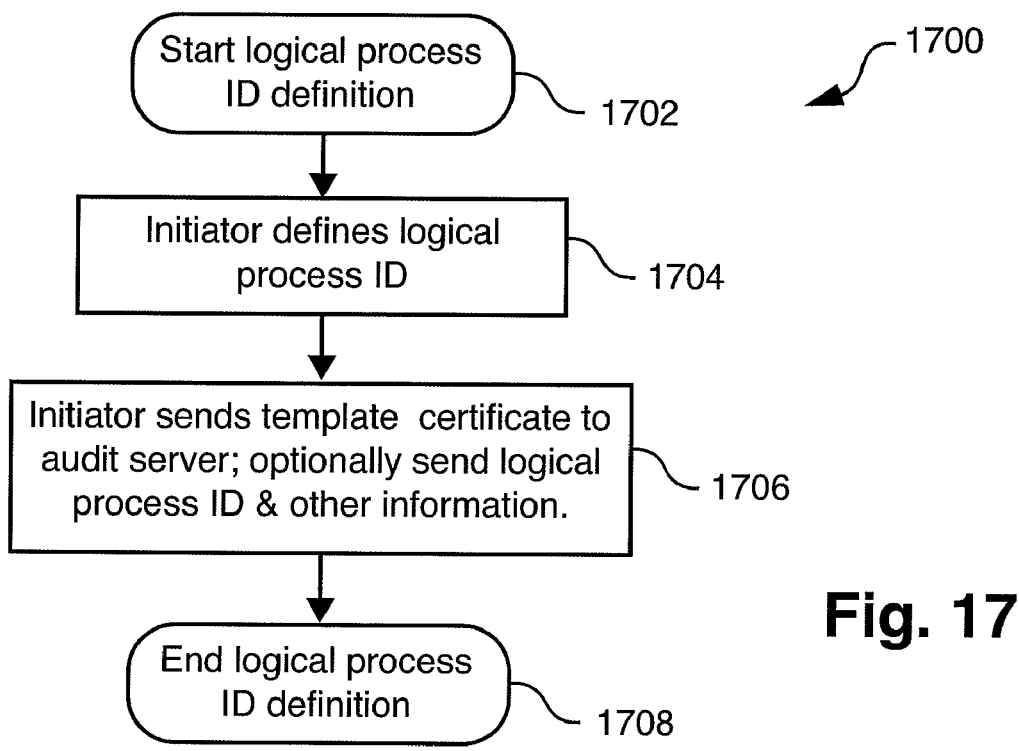
FIG. 17 is a flow diagram showing a method of workflow process ID creation and audit logging.

FIG. 17 shows a method 1700 of defining a logic process ID for an instantiating (i.e. assembling) workflow process. This method 1700 may occur within either of 103 or 105 of method 100 in FIG. 2A. The purpose is to provide a unique identifier for the instantiated workflow process as described in previous embodiments to assist in inter-connecting instantiated services into an emergent instantiated workflow process and additionally so that the unique ID may be logged by the audit server to provide ultimately more accurate information to the account server.

At 1702 the method 1700 starts and proceeds to 1704 at which the workflow process initiator defines a unique logical process ID using any of the well-known methods for doing so. At 1706 the initiator sends the applicable template certificate to the audit server and optionally sends further information such as the generated unique ID and other information as described for step 1608 in method 1600. Method 1700 ends at 1708.

Figure 18:
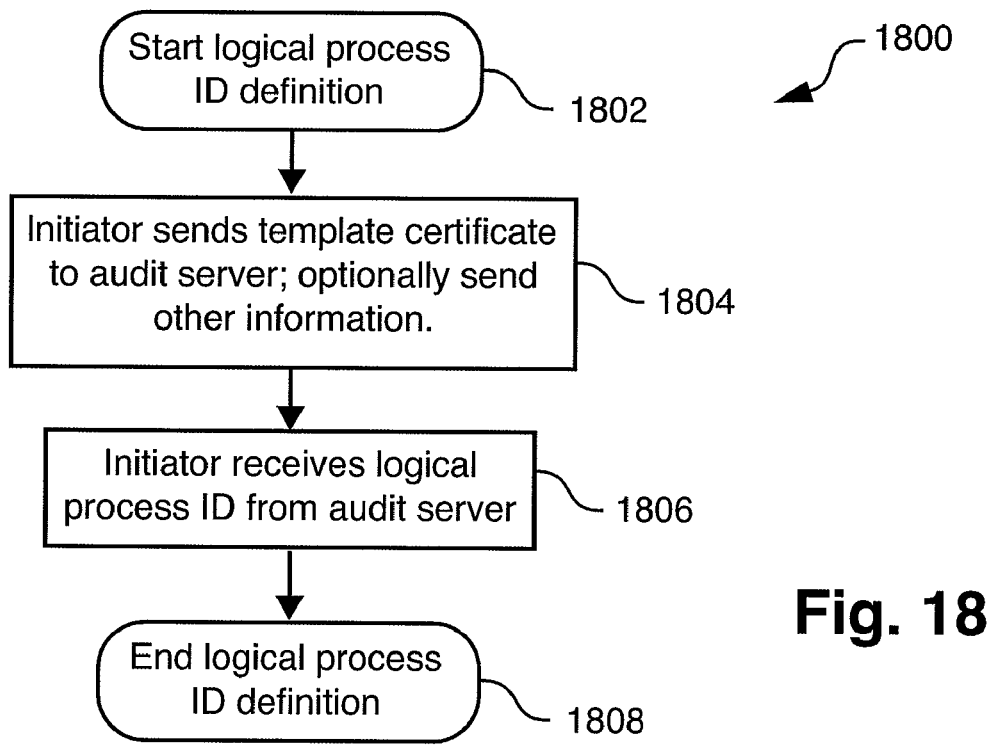
FIG. 18 is a flow diagram showing a method of workflow process ID creation from audit server.

FIG. 18, method 1800 describes an alternative method to 1700, in which the audit server defines the workflow process instantiation unique logical ID and sends it to the instantiator in exchange for receiving the applicable template certificate. This method 1800 allows the audit server greater control and security over the logical ID generation, which may improve accounting accuracy and it also allows a reduction in the minimum capability required of the instantiator, which no longer needs to generate a logical ID.

As with method 1700, method 1800 may be inserted within 103 or 105 of method 100. Method 1800 begins at 1802 and proceeds to 1804. At 1804 the initiator sends the applicable template certificate to the audit server and optionally sends other information as previously described for 1608, etc. At 1806 the initiator receives from the audit server a logical process ID for the instantiating workflow process. Method 1800 then ends at 1808.

Figure 19:
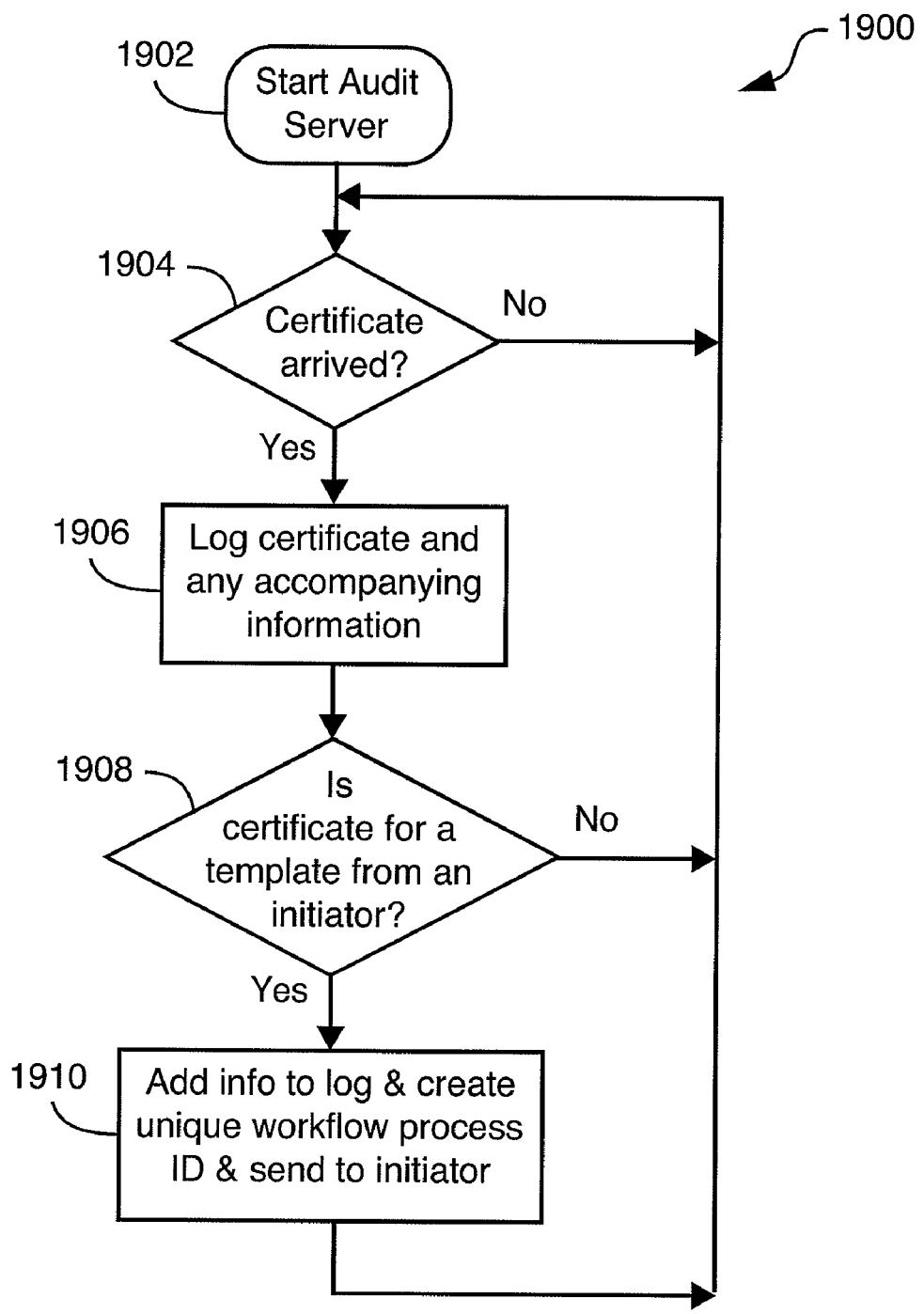
FIG. 19 is a flow diagram showing an exemplary method of audit server certificate logging and unique logical ID generation.

FIG. 19, method 1900 shows a method executed on the audit server for receiving and logging workflow template certificates sent to it by workflow process initiators and also of generating and returning unique logical IDs to the initiators. Method 1900 executing on the audit server is typically used in conjunction with method 1800 executing on the initiator.

Method 1900 begins at 1902 and proceeds to 1904 at which it checks to see if an initiator has sent a certificate in any of the well-known network communication methods and particularly a suitable one of the well-known secure network communication methods such as SSL. If no certificate has been received then 1904 loops back onto itself. If a certificate is received then 1904 proceeds to 1906 at which the audit server securely logs the received certificate and any accompanying information. Then at 1908 the certificate is checked to determine if it is a template certificate, typically sent by an initiator. If it is a template certificate then the audit server generates a unique, logical ID and securely logs it and securely sends it back to the initiator in response at 1910 and method 1900 loops back to 1904. If the test at 1908 failed then execution also returns to 1904.

Workflow Process Bundle-Certification

Figure 20:
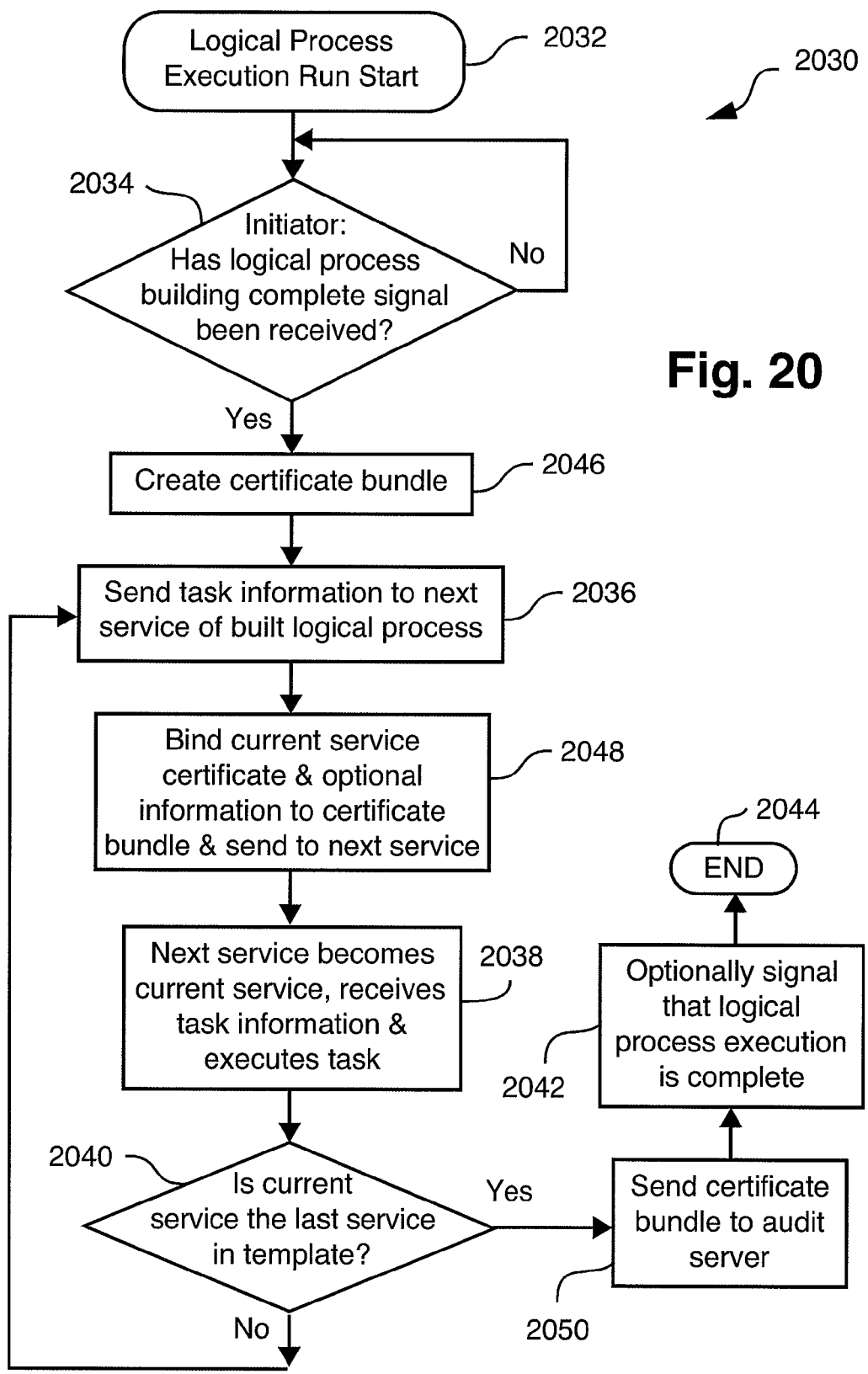
FIG. 20 is a flow diagram showing a method of workflow process execution with bundled service certification and audit logging.

FIG. 20, method 2030 shows an alternative to method 130 of executing an assembled workflow process, with the addition of creating a certificate bundle describing the executing or executed workflow instantiation. The certificate bundle is assembled by method 2030 to provide an unimpeachable description of precisely what took place in the execution phase to the audit server. Method 2030, steps 2032, 2034, 2036, 2038, 2040, 2042 and 2044 map to identical descriptions given for method 130 steps 132, 134, 136, 138, 140, 142 and 144, respectively. The additional step 2046 in method 2030 is where the initiator creates a certificate bundle which at this early stage is a container to which subsequent services executing in the workflow process will insert or append their execution certificates. Further additional step 2048 involves the current service (which might or might not include the initiator as an option) binding its execution certificate into the certificate bundle. The certificate bundle was either passed down by step 2036 or a reference to it was passed down and this proceeds down the workflow process instantiation. At further additional step 2050, at the completion of execution of the workflow process services the now-complete certificate bundle is securely sent by the last service in the workflow process to the audit server for logging.

Exemplary Workflow Process Use-Case

FIG. 21, method 2100 shows an exemplary workflow process use-case of a document update, layout and print process. The devices and services of FIG. 21 are extracted directly from the network pool of FIG. 4, with wired and wireless network connections not shown for clarity. PDA 2145 acts as initiator of the workflow process by executing initiator service 2146 under user control. PDA 2145 accesses the appropriate workflow process template 2141 for this use-case from database 2140 via network correspondence 2150. Then PDA 2145's initiator service 2146 selects the next service via 2152 to be instantiated and inserted into the workflow process. Service 2146 also sends a URI to the document required for processing & printing provided by the user to the next service as an input parameter. Print parameters are also provided by the user, including the IDs or locations or similar parameters allowing enough identification of destination printing devices to satisfy the user's requirements.

All services communicate with the audit server (not shown), sending information as previously described. The workflow process assembly and execution phases are herein described as occurring in an interleaved fashion. This is arbitrary and done for explanatory convenience.

Server 2120 provides several separate services in this example (for explanatory convenience). The first service in the workflow process instantiated and appended by the initiator 2146 is the query & layout service 2122. This service 2122 opens the document referenced by the URI passed to it. The document database holding the document is not shown for clarity and it may be accessed and opened using well-known methods in the art such as http access or other. Query & layout service 2122 on server 2120 queries data from database 2125 via 2154 and updates appropriate query fields built into the document being processed. An example of this processing may be that the document includes a spreadsheet portion which contains queries to the database 2125. Service 2122 updates the queries automatically as part of its processing by de-referencing links to database entries in 2125 and applying this information to any equations embedded in the document spreadsheet portion, thereby yielding updated information portions within the document being processed. Service 2122 then performs a re-layout of the document being processed which may involve a partial re-formatting of data based on the formatting effects of the updated spreadsheet portions. Query & layout service 2122 may be exemplified by a variable-data printing service or part thereof that is well-known in the art.

Thence service 2122 is instructed by workflow process template 2141 and user parameters passed in by the initiator 2146 to select several next services for printing the processed document. The user and template combination have requested these bifurcations of the workflow process from service 2122 to two printer drivers 2126 and 2127. Low quality printer driver service 2126 is instantiated and appended by 2122 and is directed by 2122 passing parameters and under template 2141 control to process and send the print job to low-quality printer 2105 via 2156 using embedded printer service 2106. In parallel, service 2122 also instantiates and appends to the workflow process two copies of high-quality colour print driver service 2127. The two instantiations of service 2127 receive the same job content information (i.e. the processed document from 2122) and they obey identical template 2141 constraints. However, they receive slightly differing parameters passed down originally from the user and this causes the two service instantiations of 2127 to direct their outputs to differing high-quality colour printers that reside in physically separate locations (as desired & directed) by the user. These destination printers are: printer 2130 with embedded print service 2132 connected via 2160 and located remotely to the user location; and printer 2110 with embedded printer service 2112 connected via 2158 and this printer 2110 is local to the user.

It can be seen that there is no explicit document saving service invoked in this workflow process and therefore the original document and its updates performed by service 2122 are never permanently saved. The described workflow process may be considered to be equivalent to running a script, where the document itself could be considered the script or a portion of the script. Each time the document is processed, a differing result may be output and the document remains unmodified.

As previously mentioned, each process communicates with the audit server (not shown) to provide at least a portion of the metadata information that it has to allow subsequent accurate accounting of the true cost of the workflow process. Table 1 shows some of the metadata types that might be reasonably available to the exemplary workflow process and its services of use-case method 2100 and that may be reasonably used to compute and charge for the cost of the workflow process execution.

TABLE 1

Exemplary job metadata that could be sent to an audit server.

| Service Type | Metadata Type | Source or derivation of metadata | Potential use in job-cost accounting |
|---|---|---|---|
| Printing | Resolution | Parameter | Quality & machinery wear & tear |
| | Toner/Ink quality | Parameter or device property | Cost of ink/toner |
| | Paper stock | Parameter or device property | Cost of stock |
| | Quantity of pages and/or page area | Parameter or metadata implicitly or explicitly output by previous service | Multiplier on some other parameters, wear & tear cost & run-time cost of services |
| | Content type: natural image, graphical, text, etc | Content analysis | Proportional multiplier on other properties such as ink/toner, resolution. |
| | Transparency | Content analysis | Compositing & rendering processing complexity, run-time or similar. |
| | Distribution of print job to various printers | Parameter or service property | Multiplier on other parameters |
| | Print or printer driver Device ID or type | Device property or parameter | Machinery-derived cost component |
| | Number of jobs | Parameter | Multiplier on other parameters |
| Data query & layout | Number of jobs | Parameter | Multiplier on other parameters |
| | Quantity of pages and/or page area | Parameter or metadata implicitly or explicitly output by previous service | Multiplier on some other parameters, wear & tear cost & run-time cost of services |
| | Content type & quantity: natural image, graphical, text, etc | Content/page/ document analysis | Proportional multiplier on other properties |
| | Spreadsheet database references & equations | Embedded or referenced content & processing instructions | Compute effort & run-time, database access count. |
| | Layout processing | Content analysis & layout algorithm application | Compute effort & run-time. Selective quality of processing |
| Initiator | Template type | Parameter/User input | Overall multiplier or alternative costing method |

TABLE 1-continued

Exemplary job metadata that could be sent to an audit server.

| Service Type | Metadata Type | Source or derivation of metadata | Potential use in job-cost accounting |
|---|---|---|---|
| | Destination printers | Parameter/User input | Overall multiplier |
| | User ID | Parameter/User input | Overall multiplier |

Exemplary Job Metadata

Table 1 shows a variety of possible metadata types that could b e forwarded to the audit server for logging and consequently be of potential use to the accounting server for accurate cost-accounting of the workflow process instantiation of FIG. 21, 2100. The content of Table 1 is not intended to be exhaustive nor are any of the metadata items necessarily required for the accounting method of the disclosed JITWC arrangements. Rather, Table 1's contents show how the disclosed JITWC arrangements enables accurate accounting of a workflow process through the potential provision and potential use of metadata.

Table 1 shows several distinct service types and against these a range of metadata types that might be logged to the audit server by that type of service. Each metadata type is briefly described as to a possible source of that metadata in relation to the service type and then a potential use or meaning of the metadata in the context of cost-accounting for the workflow is given. It may be seen that many types of metadata exist and that these may have overlapping meanings or usages in cost-accounting, such as, for instance, the ID or model of a printer might be used as a major input parameter to costing a job instead of other parameters shown such as paper stock, resolution, toner/ink quality, and quantity of pages.

It can be seen by a person skilled in the art that a useful costing equation may be executed on an accounting server using some or all of the exemplary parameters available from Table 1. There is known prior art that utilises a quantity of pages click-count and a machine ID for counting the cost of printing or photocopying services. This known method is commonly called a click-count costing or click-charge. The disclosed JITWC arrangements can be seen to support such a prior art method of cost-accounting but then the disclosed JITWC arrangements can provide so much more accurate information as can be seen from Table 1.

Table 1 also shows that equivalent information may be obtained from several or alternative services forming a workflow process. One service may be able to provide a metadata type of information natively, (i.e. at lower cost) than another service might be able to do so. For instance, it is reasonable to assume that a layout service handling object-based data may be able to provide content type & quantity metadata natively and with minimal extra processing compared with a printer or printer driver service that operates typically at pixel level. Note, for the benefits of clarity, Table 1 does not discriminate between the printer driver services 2126, 2127 and the embedded printer services 2106, 2112, 2132 of use-case 2100 because the apportionment of functionality and processing effort between printer drivers and embedded printing services varies considerably in the market place.

There follows an exemplary cost-accounting equation computed by an accounting server that might be applied to costing the workflow process of 2100, FIG. 21 and is based on a subset of parameters listed in Table 1 that were logged onto the audit server:

Equation 1:

Workflow 2100 use-case cost=

Sum per print job:

$$( \\ A\$ \text{ (resolution[printer type])} \\ * B\$ \text{ (toner quality[printer type])} \\ * (\text{SUM per content type:} \\ \text{total pages area[content type]} * C\$ \text{ (content type)}) \\ + MS \text{ (printer type)} \\ ) \\ + L\$ \text{ (layout \& processing run-time)}$$

Exemplary costing equation 1 can be briefly explained as firstly separately costing each of the three physical print jobs described in use-case 2100 involving firstly the product of costing functions A$, B$ operating on parameters or properties of the print jobs, specifically being resolution and toner quality, respectively. The costing function C$, which is operating on metadata content type, is multiplied by the total pages area printed for that content type and is calculated per content type, summed and then multiplied by the results of A$ & B$ costing functions. This portion of the calculation allows a more accurate costing of toner used per print job than does current known methods. The equation shown does contain at least one assumption, being the mean cost of toner per content type per area per resolution. This assumption may be known by either the audit server or accounting server and might typically be built into C$ costing function, however, in a yet more accurate costing equation example, this assumption might be replaced with a more accurate, per pixel type of cost-accounting in another implementation of the disclosed JITWC arrangements (not shown).

The amortised maintenance cost overhead per printer, represented by cost function M$ is summed with the current calculated cost per print job, the three print job calculated costings are then together summed and then summed with the cost of the layout processing run-time of service 2122 represented by cost function L$ in Equation 1. It can be seen that this relatively simple cost-accounting example can provide a much more accurate costing than the known methods in the art. The vendor is therefore able to more accurately charge the customer for the workflow with the consequent advantages to both vendor and customer as previously explained.

As may be seen by a person skilled in the art, the described embodiments of the invention each demonstrate a business system for computing customer charges for a workflow process.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

APPENDIX A

Exemplary XML Workflow Process Template for PDA device

```
<JITconfiguration>
<device type="PDA"/>
<workflows>
    <workflow name="Staff Purchase" description="Staff Purchase"
    initial="User Input
Form" destination="Print Order"/>
    <workflow name="Document Search" description="Document Search"
    initial="User
Search Keywords" destination="Display Result"/>
</workflows>
<capabilities>
        <capability name="User Input Form" workflow_name="Staff
        Purchase"
        description="none" bind="http://workflow_database/forms/
        staff_purchase.htm"/>
        <capability name="Attach Quote" workflow_name="Staff Purchase"
        description="none" bind="http://this_device/
        document_browse.exe"/>
        <capability name="User Search Keywords" workflow_name=
        "Document Search"
        description="none"
        bind="http://workflow_database/forms/
        user_search_keywords.htm"/>
        <capability name="Display Result" workflow_name="Document
        Search"
        description="none" bind="http://this_device/
        display_search_result.exe"/>
</capabilities>
<transforms>
        <transform workflow="Staff Purchase"
            step="User Input Form" transformp_step="Attach Quote"/>
        <transform workflow="Staff Purchase"
            step="Attach Quote" transform_step="Print Order"/>
        <transform workflow="Document Search"
            step="User Search Keywords" transform_step="Master
            Search"/>
        <transform workflow="Document Search"
            step="Display Result" transform_step="End"/>
</transforms>
</JITconfiguration>
```

APPENDIX B

Exemplary XML Workflow Process Template for scanner device

```
<JITconfiguration>
<device type="Scanner"/>
    <workflows>
        <workflow name="Staff Purchase" description="Staff Purchase"
        initial="User Input Form" destination="Print Order"/>
    </workflows>
<capabilities>
        <capability name="Attach Quote" workflow_name="Staff Purchase"
        description="none" bind="http://this_device/scan.exe"/>
</capabilities>
<transforms>
        <transform workflow="Staff Purchase"
            step="Attach Quote" transform_step=Print Order"/>
    </transforms>
</JITconfiguration>
```

APPENDIX C

Exemplary XML Workflow Process Template for printer device

```
<JITconfiguration>
    <device type="Printer"/>
<workflows>
        <workflow name="Staff Purchase" description="Staff Purchase"
        initial="User Input Form" destination="Print Order"/>
</workflows>
```

APPENDIX C-continued

Exemplary XML Workflow Process Template for printer device

```
<capabilities>
        <capability name="Print Order" workflow_name="Staff Purchase"
        description="none" bind="http://this_device/print.exe"/>
</capabilities>
<transforms>
        <transform workflow="Staff Purchase"
            step="Print Order" transform_step="End"/>
</transforms>
</JITconfiguration>
```

The claims defining the invention are as follows:

1. A method, implemented in a computer system, of constructing a distributed process engine comprising an ordered list of network services that forms a process for performing a task, wherein said network services are drawn from a pool of network services executing on a plurality of computing devices communicating over a network, said method comprising:
a processor executing the steps of:
providing a template comprising a plurality of constraints on network services forming said process for performing the task;
analyzing the provided template to select a first network service, executing on a first one of the plurality of computing devices, from said pool of network services, depending on a first of a plurality of constraints in said template;
instantiating the selected first network service and appending the instantiated first network service to the ordered list of the distributed process engine;
identifying, by the first network service, a subset of potential second network services from the pool of network services depending on a second of the plurality of constraints in said template;
selecting, by the first network service, a second network service, executing on a second one of the plurality of computing devices, from the subset of potential second network services based on a constraint monitored by said first network service;
instantiating, by the first network service, the selected second network service and appending the instantiated second network service to the ordered list of the distributed process engine; and
transferring, by the first network service, responsibility for further construction of the ordered list for the distributed process engine to the instantiated second network service, said transfer applying, by the first network service, an event stimulus to the instantiated second network service, thereby enabling the instantiated second network service to perform the steps of:
(i) analyzing the template to identify a subset of potential third network services from the pool of network services depending on a third of the plurality of constraints in said template;
(ii) selecting, by the second network service, a third network service executing on a third one of the plurality of computing devices, from said pool of network services; and
(iii) instantiating the selected third network service and appending the instantiated third network service to the ordered list of the distributed process engine.

2. The method of claim 1 wherein said instantiating step is further based on information relating to a task to be carried out by said process.

3. The method of claim 1 in which the constraint is initiated or evaluated by user interaction at a physical location of instantiation of at least one of said services in said ordered list other than the start and end services of said ordered list.

4. The method of claim 1 in which the constraint is initiated, evaluated or caused externally to said service monitoring said constraint.

5. The method of claim 1 in which the constraint is initiated, evaluated or caused to said service monitoring said constraint.

6. The method of claim 1 in which the constraint is initiated, evaluated or caused during the construction period of said ordered list of network services.

7. The method of claim 1 wherein said process for carrying out of said task occurs substantially simultaneously with said method of constructing said ordered list of network services.

8. The method of claim 7 wherein said process for carrying out of said task continues or pauses depending on progress of said method of constructing said ordered list of network services.

9. The method of claim 1 or claim 8 wherein the constructed ordered list of network services is deconstructed after carrying out the tasks.

10. The method of claim 7, further comprising the step of determining usage information for a complete list or a partial list of network services and task information about the corresponding task or partial task carried out.

11. The method of claim 10, further comprising the steps of:
 (a) sending, by the network services in the complete list or the partial list of network services, said usage information and said task information over the network to an audit server; and
 (b) accumulating, by the audit server, said usage information and said task information for said complete list or partial list of network services.

12. The method of claim 11, wherein said usage information comprises at least one of: type of service, quantity of data processed, information about data processed, and quality level of the processing.

13. The method of claim 11, further comprising the step of accumulating, by the audit server, usage information and task information for another concurrent complete list or partial list of network services assembled from the network services in the pool.

14. The method of claim 11, further comprising the step of determining a customer charge depending upon at least one of the accumulated usage information and the accumulated task information.

15. The method of claim 11, wherein said second service is selected from said subset of potential second services dependent upon said second service having a valid security certificate, and wherein the accumulating step comprises:
 (a) verifying, in regard to each said network service, that said network service has a corresponding valid security certificate, and
 (b) performing the accumulating step for those network services having said corresponding valid security certificate.

16. The method of claim 1 wherein said process for carrying out of said task occurs after said method of constructing said ordered list of network services.

17. The method of claim 1 wherein each service comprised by said ordered list removes itself from said ordered list upon completion of its portion of the task being carried out.

18. The method of claim 1, wherein said second service is selected from said subset of potential second services dependent upon said second service having a valid security certificate.

19. A system for constructing a distributed process engine comprising an ordered list of network services that forms a process for performing a task, wherein said services are drawn from a pool of network services executing on a plurality of computing devices communicating over a network, said system comprising:
 at least one memory module for storing a program; and
 at least one processor for executing the program, said program comprising:
 code for providing a template comprising a plurality of constraints on network services forming said process for performing the task;
 code for analyzing the provided template to select a first network service, executing on a first one of the plurality of computing devices, from said pool of network services, depending on a first of the plurality of constraints in said template;
 code for instantiating the selected first network service and appending the instantiated first network service to the ordered list of the distributed process engine;
 code for identifying, by the first network service, a subset of potential second network services depending on a second of the plurality of constraints in said template;
 code for selecting, by the first network service, a second network service, executing on a second one of the plurality of computing devices, from the subset of potential second network services based on a constraint monitored by said first network service;
 code for instantiating, by the first network service, the selected second network service and appending the instantiated second network service to the ordered list of the distributed process engine; and
 code for transferring, by the first network service, responsibility for further construction of the ordered list for the distributed process engine to the instantiated second network service, said transfer applying, by the first network service, an event stimulus to the instantiated second network service, thereby enabling the instantiated second network service to perform the steps of:
 (i) analyzing the template to identify a subset of potential third network services from the pool of network services depending on a third of the plurality of constraints in said template;
 (ii) selecting, by the second network service, a third network service executing on a third one of the plurality of computing devices, from said pool of network services; and
 (iii) instantiating the selected third network service and appending the instantiated third network service to the ordered list of the distributed process engine.

20. A non-transitory computer readable medium storage medium having recorded thereon a computer program for directing a processor to execute a method for constructing a distributed process engine comprising an ordered list of network services that forms a process for performing a task, wherein said network services are drawn from a pool of network services executing on a plurality of computing devices communicating over a network, said program comprising:
 code for providing a template comprising a plurality of constraints on network services forming said process for performing the task;

code for analyzing the provided template to select a first network service, executing on a first one of the plurality of computing devices, from said pool of network services, depending on a first of the plurality of constraints in said template;

code for instantiating the selected first network service and appending the instantiated first network service to the ordered list of the distributed process engine;

code for identifying, by the first network service, a subset of potential second services from the pool of network services depending on a second of the plurality of constraints in said template;

code for selecting, by the first network service, a second network service, executing on a second one of the plurality of computing devices, from the subset of potential second network services based on a constraint monitored by said first network service;

code for instantiating, by the first network service, the selected second network service and appending the instantiated second network service to the ordered list of the distributed process engine; and code for transferring, by the first network service, responsibility for further construction of the ordered list for the distributed process engine to the instantiated second network service, said transfer applying, by the first network service, an event stimulus to the instantiated second network service, thereby enabling the instantiated second network service to perform the steps of:

(i) analyzing the template to identify a subset of potential third network services from the pool of network services depending on a third of the plurality of constraints in said template;

(ii) selecting, by the second network service, a third network service executing on a third one of the plurality of computing devices, from said pool of network services; and (iii) instantiating the selected third network service and appending the instantiated third network service to the ordered list of the distributed process engine.

* * * * *